US010817163B2

(12) United States Patent
Critchlow

(10) Patent No.: US 10,817,163 B2
(45) Date of Patent: Oct. 27, 2020

(54) METHOD AND DEVICE FOR MANAGING ITEM

(71) Applicant: SAMSUNG ELECTRONICS CO., LTD., Suwon-si (KR)

(72) Inventor: Stephen Paul Critchlow, Middlesex (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 800 days.

(21) Appl. No.: 15/040,105

(22) Filed: Feb. 10, 2016

(65) Prior Publication Data

US 2016/0253063 A1 Sep. 1, 2016

(30) Foreign Application Priority Data

Feb. 26, 2015 (GB) .................................. 1503224.6
Sep. 25, 2015 (KR) ........................ 10-2015-0137100

(51) Int. Cl.
*G06F 3/048* (2013.01)
*G06F 3/0486* (2013.01)
*G06F 3/0482* (2013.01)
*G06F 3/0484* (2013.01)
(Continued)

(52) U.S. Cl.
CPC .......... *G06F 3/0486* (2013.01); *G06F 3/0482* (2013.01); *G06F 3/0488* (2013.01); *G06F 3/04842* (2013.01)

(58) Field of Classification Search
CPC .. G06F 3/0486; G06F 3/0482; G06F 3/04842; G06F 3/0488
See application file for complete search history.

(56) References Cited

U.S. PATENT DOCUMENTS 6,243,724 B1 * 6/2001 Mander ................. G06F 3/0483
715/273
7,770,120 B2 * 8/2010 Baudisch ............ G06F 3/04883
715/740
(Continued)

FOREIGN PATENT DOCUMENTS

AU 20140204371 A1 1/2015
CN 102830907 A 12/2012
(Continued)

OTHER PUBLICATIONS

Communication dated Oct. 4, 2017, from the European Patent Office in counterpart European Application No. 16755789.1.
(Continued)

*Primary Examiner* — Nicholas Augustine
(74) *Attorney, Agent, or Firm* — Sughrue Mion, PLLC

(57) ABSTRACT

A device includes: a display configured to display a container object and a plurality of items that are movable into the container object; a user input device configured to receive a user input; and a controller configured to in response to the user input indicating a first gesture moving from the container object to a current position of the user input, control the display to display a first connector along a first path of the first gesture, determine a first item of the plurality of items, the first item being located within a threshold distance from an end of the connector, and move the first item into the container object.

20 Claims, 26 Drawing Sheets

(51) Int. Cl.
*G06F 3/0488* (2013.01)
*G06F 3/01* (2006.01)

(56) References Cited

U.S. PATENT DOCUMENTS

| | | | | |
|---|---|---|---|---|
| 8,381,122 | B2* | 2/2013 | Louch | G06F 9/451 |
| | | | | 715/784 |
| 8,432,396 | B2* | 4/2013 | Paquette | G06F 3/0483 |
| | | | | 345/427 |
| 8,473,859 | B2* | 6/2013 | Chaudhri | G06F 3/048 |
| | | | | 715/782 |
| 8,479,110 | B2* | 7/2013 | Johnson | G06F 3/04886 |
| | | | | 715/764 |
| 8,954,887 | B1 | 2/2015 | Tseng et al. | |
| 9,405,429 | B1* | 8/2016 | Gopalakrishnan | G06F 3/0486 |
| 2003/0064757 | A1* | 4/2003 | Yamadera | G11B 19/025 |
| | | | | 455/566 |
| 2009/0307623 | A1* | 12/2009 | Agarawala | G06F 3/04815 |
| | | | | 715/765 |
| 2010/0058182 | A1 | 3/2010 | Jung | |
| 2010/0077343 | A1* | 3/2010 | Uhl | G06F 3/0483 |
| | | | | 715/787 |
| 2010/0229129 | A1* | 9/2010 | Price | G06F 3/04883 |
| | | | | 715/863 |
| 2010/0241955 | A1* | 9/2010 | Price | G06F 3/04883 |
| | | | | 715/702 |
| 2011/0059759 | A1 | 3/2011 | Ban | |
| 2012/0030628 | A1 | 2/2012 | Lee et al. | |
| 2012/0240044 | A1* | 9/2012 | Johnson | G06F 3/04886 |
| | | | | 715/716 |
| 2012/0297329 | A1 | 11/2012 | Tanaka et al. | |
| 2013/0019193 | A1* | 1/2013 | Rhee | G06F 3/0486 |
| | | | | 715/769 |
| 2013/0167090 | A1 | 6/2013 | Tomizu | |
| 2013/0167091 | A1 | 6/2013 | Klappert et al. | |
| 2013/0174069 | A1* | 7/2013 | Lee | G06F 3/04817 |
| | | | | 715/769 |
| 2014/0013254 | A1* | 1/2014 | Hosein | G06F 3/0486 |
| | | | | 715/765 |
| 2014/0229342 | A1* | 8/2014 | Marlowe | G06Q 30/0643 |
| | | | | 705/27.2 |
| 2014/0282013 | A1* | 9/2014 | Amijee | G06F 3/0482 |
| | | | | 715/732 |
| 2015/0074606 | A1* | 3/2015 | Melen | G06F 3/04842 |
| | | | | 715/835 |
| 2015/0121266 | A1* | 4/2015 | Gao | G06F 1/1694 |
| | | | | 715/765 |

FOREIGN PATENT DOCUMENTS

| | | |
|---|---|---|
| CN | 103076976 A | 5/2013 |
| EP | 2869182 A1 | 5/2015 |
| KR | 10-2014-0079939 A | 6/2014 |
| KR | 10-2015-0012010 A | 2/2015 |
| WO | 2013/060100 A1 | 5/2013 |
| WO | 2014106495 A1 | 7/2014 |

OTHER PUBLICATIONS

Anonymous: "iPhone User Guide for iOS 5.1", Dec. 3, 2014, XP055398540, Retrieved from the Internet: URL:https://manuals.info.apple.com/MANUALS/IOO0/MA1622/en_US/iphone_ios5_user_guide.pdf (179 pages total).

Anonymous: "Apple-Support-Search ", Aug. 14, 2017, XP055398543, Retrieved from the Internet: URL:https://manuals.info.apple.com/MANUALS /IOO0/MA1622/en_US/iphone_ios5_user_guide.pdf(3 pages total).

Communication dated Jul. 11, 2016 issued by the International Searching Authority in counterpart International Application No. PCT/KR2016/001290 (PCT/ISA/210/220/237).

Communication dated Jul. 23, 2015 issued by the British Patent Office in counterpart British Patent Application No. 1503224.6.

Communication dated Jun. 26, 2018, issued by the State Intellectual Property Office of the People's Republic of China in counterpart Chinese Patent Application No. 201610104590.1.

Communication dated Oct. 10, 2018 issued by the European Patent Office in Counterpart European Application No. 16 755 789.1.

Communication dated Mar. 29, 2019 issued by the State Intellectual Property of P.R. China in counterpart Application No. 201610104590.1.

Communication dated Jul. 2, 2019, issued by the European Patent Office in counterpart European Application No. 16755789.1.

Communication dated Oct. 30, 2019 issued by the State Intellectual Property Office of P.R. China in counterpart Chinese Application No. 201610104590.1.

\* cited by examiner

METHOD AND DEVICE FOR MANAGING ITEM

CROSS-REFERENCE TO RELATED APPLICATIONS

This application claims priority from UK Patent Application No. 1503224.6, filed on Feb. 26, 2015, in the UK Patent Office and Korean Patent Application No. 10-2015-0137100, filed on Sep. 25, 2015, in the Korean Intellectual Property Office, the disclosures of which are incorporated herein by reference in their entireties.

BACKGROUND

1. Field

Methods and apparatuses consistent with exemplary embodiments relate to managing items, and moving an item into a container object.

2. Description of Related Art

With advances in multimedia and data processing technologies, devices have become capable of executing a large number of applications and processing a variety of information. Accordingly, devices display many items related to various applications, image files, and text files on screens of the devices. To efficiently manage these items, the devices arrange the items by displaying a graphic user interface (GUI) having a directory structure.

Traditional GUIs used in desktop computers execute an operation of moving a plurality of items into a folder based on combinations of various keys. However, these traditional GUIs are not suitable for devices, such as smartphones, tablet computers, and wearable devices, in which a user controller is limited. In addition, as a screen size and resolution of a device increase, more items are displayed on a screen of the device. Therefore, there is a need for a method capable of promptly and efficiently managing various items.

SUMMARY

Additional aspects will be set forth in part in the description which follows and, in part, will be apparent from the description, or may be learned by practice of the presented exemplary embodiments.

According to an aspect of an exemplary embodiment, there is provided a device including: a display configured to display a container object and a plurality of items that are movable into the container object; a user input device configured to receive a user input; and a controller configured to, in response to the user input indicating a first gesture moving from the container object to a current position of the user input, control the display to display a first connector along a first path of the first gesture, determine a first item of the plurality of items, the first item being located within a threshold distance from an end of the connector, and move the first item into the container object.

The controller may be further configured to, in response to the user input indicating a second gesture forming a loop, control the display to display a second connector along a second path of the second gesture, determine a second item of the plurality of items, enclosed by the loop, and move the second item into the container object.

The controller may be further configured to determine the second item in response to at least one among all portions of the second item being enclosed by the loop, and a threshold portion or more of the second item being enclosed by the loop.

The controller may be further configured to control the display the second item moving into the container object along the second connector based on a predetermined animation effect.

The controller may be further configured to determine a third item of the plurality of items within the threshold distance from the current position for a predetermined time, and move the third item into the container object.

The controller may be further configured to control the display to distinguishably display the first item.

The controller may be further configured to control the display to display the first item moving into the container object along the first connector.

The container object and the plurality of items may be displayed on a first page of a plurality of pages, and the controller may be further configured to, in response to the user input corresponding to an edge of the first page, control the display to display a second page of the plurality of pages.

The controller may be further configured to change a shape of the connector during the receiving of the user input.

The controller may be further configured to shorten the connector according to a predetermined criteria during the receiving of the user input.

The controller may be further configured to control the display to display a menu for managing the container object in response to receiving a user input of touching the container object for a threshold time.

The controller may be further configured to reduce a displayed size of the container object and the plurality of items during the displaying of the menu.

According to an aspect of another exemplary embodiment, there is provided a method of managing an item, the method including: displaying a container object and a plurality of items that are movable to the container object; receiving a user input; displaying, in response to the received user input indicating a first gesture moving from the container object to a current position, a first connector along a first path of the first gesture; determining a first item of the plurality of items within a threshold distance from an end of the connector; and moving the first item into the container object.

The method may further include: displaying, in response to the received user input forming a loop, a second connector along a second path of the second gesture; determining a second item of the plurality of items enclosed by the loop; and moving the second item into the container object.

The determining the second item may include determining at least one among all portions of the second item are completely enclosed by the loop and at least a threshold portion of the second item is enclosed by the loop.

The may further include determining a third item of the plurality of items within the threshold distance from the current position for a predetermined time; and moving the third item into the container object.

The method may further include distinguishably displaying the first item.

The method may further include displaying the first item moving into the container object along the first connector.

The container object and the plurality of items may be displayed on a first page of the plurality of pages; and the method may further include displaying a second page of the plurality of pages in response to the user input corresponding to an edge of the first page.

The method may further include changing a shape of the first connector during the receiving of the user input.

According to an aspect of yet another exemplary embodiment, there is provided a device including: a touchscreen display configured to display a container object and a plurality of items; and a controller configured to, in response to the user input indicating a gesture originating from the container object, determine a facing direction of the user input, determine at least one item of the plurality of items within a threshold distance of the user input and corresponding to the facing direction, control the touchscreen display to display an indicator corresponding to the determined at least one item, and, in response to the user input stopping, move the determined at least one item into the container object.

The threshold distance may be adjustable according to a user selection.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
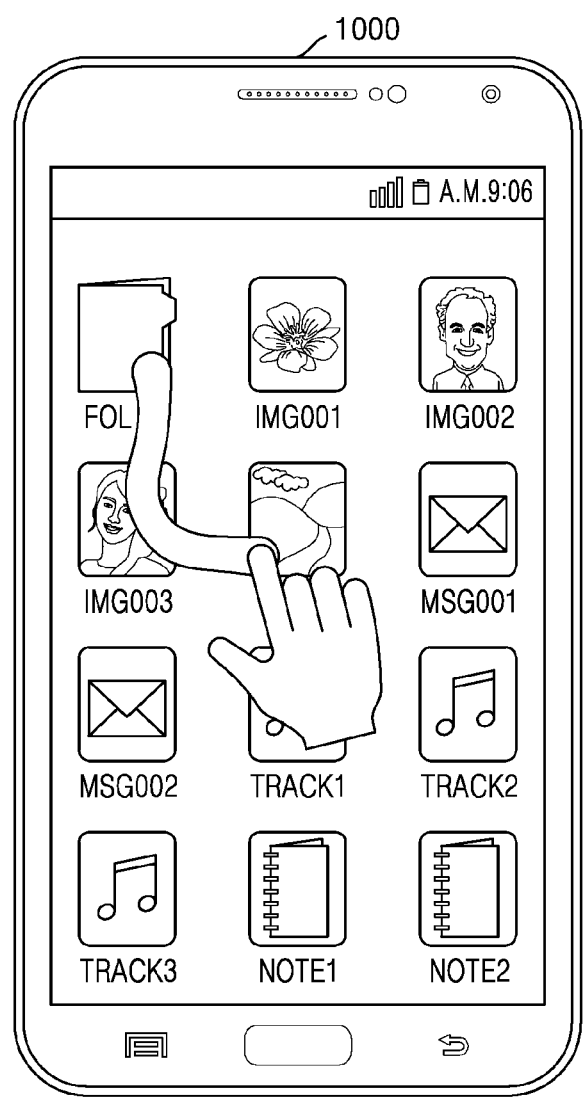
FIG. 1 is a diagram for describing an example in which a device moves an item into a container object, according to an exemplary embodiment.

Reference will now be made in detail to exemplary embodiments, examples of which are illustrated in the accompanying drawings, wherein like reference numerals refer to like elements throughout. In this regard, exemplary embodiments may have different forms and should not be construed as being limited to the descriptions set forth herein. Accordingly, exemplary embodiments are described below, by referring to the figures, to explain aspects of the present inventive concept. As used herein, the term "and/or" includes any and all combinations of one or more of the associated listed items. Expressions such as "at least one of" when preceding a list of elements, modify the entire list of elements and do not modify the individual elements of the list.

The terms used in the present disclosure will be described briefly and exemplary embodiments will then be described in detail.

The terms used in the present disclosure are those terms currently used in the art in consideration of functions in regard to the inventive concept, but the terms may vary according to the intention of those of ordinary skill in the art, precedents, or new technology in the art. Also, specified terms may be selected by the applicant, and in this case, the detailed meaning thereof will be described in the detailed description of the inventive concept. Thus, the terms used in the present disclosure should be understood based on the meaning of the terms and the overall description of the inventive concept.

It will also be understood that the terms "comprises", "includes", and "has", when used herein, specify the presence of stated elements, but do not preclude the presence or addition of other elements, unless otherwise defined.

Also, the terms "unit" and "module" used herein represent a unit for processing at least one function or operation, which may be implemented by hardware, software, or a combination of hardware and software.

In the specification, the term "container object" may mean a user interface (UI) object capable of containing a plurality of items in a device 1000. The container object may be a folder and may be a different type of user interface object.

In the specification, the term "item" may be an object displayed on a screen of the device 1000 to execute an application, an image file such as a photograph, and a text file and may be an icon, for example, an image, or a text.

Hereinafter, exemplary embodiments will be described in detail with reference to the accompanying drawings.

FIG. 1 is a diagram for describing an example in which the device 1000 moves an item into a container object, according to an exemplary embodiment.

The device 1000 according to the exemplary embodiment may be implemented in various forms. Examples of the device 1000 may include a mobile phone, a smartphone, a personal computer (PC), a tablet PC, a personal digital assistant (PDA), a smart television, a laptop computer, a media player, an MP3 player, a portable multimedia player (PMP), a digital camera, a kiosk, a navigation device, a global positioning system (GPS) device, an e-book reader, a digital broadcasting terminal, a micro server, another mobile device, a non-mobile computing device, and a home appliance, such as a refrigerator or washing machine including a display device, but are not limited thereto. In addition, the device 1000 may include a wearable device, such as a watch, glasses, a hair band, or a ring, which has a communication function and a data processing function. However, the device 1000 is not limited thereto. The device 1000 may include any type of device capable of receiving an object from a server through a network and executing the received object.

Referring to FIG. 1, the device 1000 may display a container object and a plurality of items on a screen. In addition, the device 1000 may receive a user input of touching and dragging the container object. In addition, the device 1000 may display a connector on the screen in response to the user input, the connector being connected from the container object to a current position of the user input. Furthermore, the device 1000 may move an item of the plurality of items on the screen, the item being located within a predetermined distance from an end of the connector, into the container object.

Figure 2:
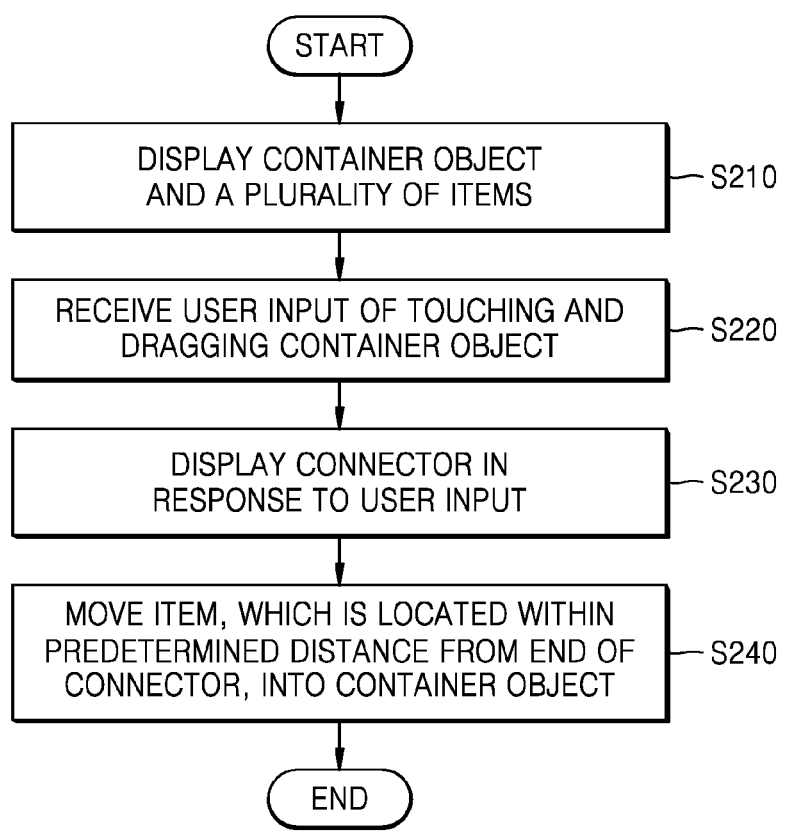
FIG. 2 is a flowchart of a method of moving an item into a container object in a device, according to an exemplary embodiment.

FIG. 2 is a flowchart of a method of moving an item into a container object in a device 1000, according to an exemplary embodiment.

In operation S210, the device 1000 may display a container object and a plurality of items on a screen. The item may be an object displayed on the screen of the device 1000 to execute an application, an image file, and/or a text file. For example, the item may be an icon, an image, or a text.

When a file corresponding to the item is an application, the device 1000 may execute the application corresponding to the item based on a user input of touching the item.

In addition, a software screen (for example, a home screen, a lock screen, or an application screen) of the device 1000 may include a plurality of pages, and the container object and the plurality of items may be displayed on each of the pages. The device 1000 may display one page or may display other pages in response to a user input of turning the displayed page.

In operation S220, the device 1000 may receive a user input of touching and dragging the container object. The device 1000 may receive the user input of touching the container object and dragging the container object to an item to be moved into the container object.

In operation S230, the device 1000 may display a connector in response to the user input. The device 1000 may display the connector along a movement path of the user input. For example, the connector may be displayed along a locus of a touching and dragging input.

In addition, the device 1000 may change a shape of the connector while receiving the user input. The device 1000 may change the shape of the connector such that a distance between two ends of the connector is minimized. The two ends of the connector may be ends of the connector, which are respectively located on the container object and at a current position of the user input.

In S240, the device 1000 may move an item, which is located within a predetermined distance from the end of the connector, into the container object. While the connector is displayed on the screen, the device 1000 may determine whether there is an item located within the predetermined distance from the end of the connector. The predetermined distance may be changed by a user setting. According to one or more exemplary embodiments, the device 1000 may move only an item overlapping the end of the connector into the container object.

Figure 3:
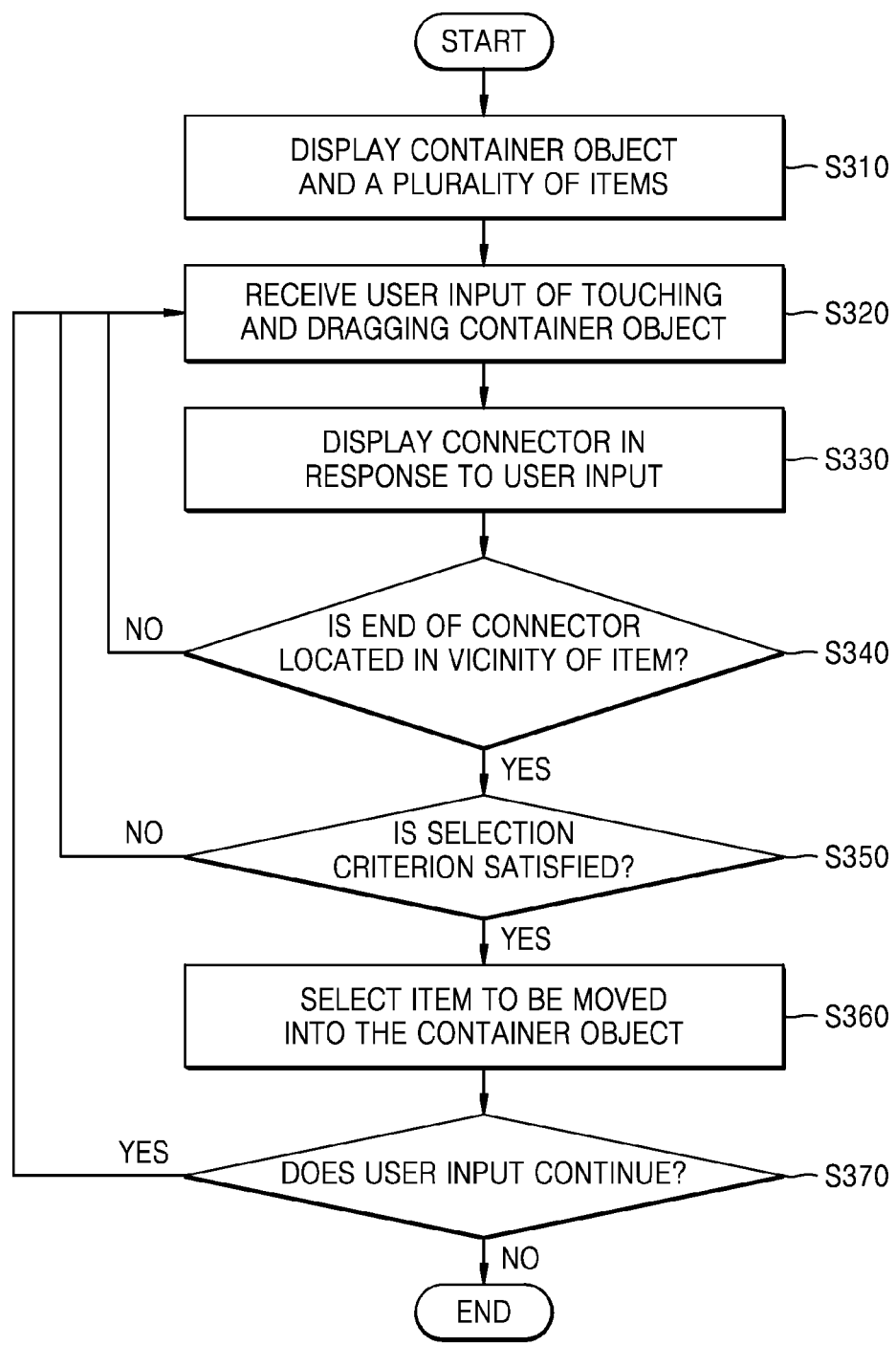
FIG. 3 is a flowchart of a method of moving an item into a container object in a device, according to another exemplary embodiment.

FIG. 3 is a flowchart of a method of moving an item into a container object in a device 1000, according to another exemplary embodiment.

Because operations S310 to S330 are substantially the same as operations S210 to S230 of FIG. 2, redundant descriptions thereof will be omitted.

In operation S340, the device 1000 may determine whether an item is located in the vicinity of an end of a connector. According to one or more exemplary embodiments, the device 1000 may determine whether the end of the connector overlaps the item or may determine whether the item is located within a predetermined distance from the end of the connector.

When the item is not located in the vicinity of the end of the connector, the device 1000 may return to operation S320 and may receive a new user input.

In operation S340, when there is an item located in the vicinity of the end of the connector, the device 1000 may perform operation S350.

In operation S350, the device 1000 may determine whether the item in the vicinity of the end of the connector satisfies a selection criterion. At this time, the item satisfying the selection criterion may be, for example, an item that is located within the predetermined distance from the end of the connector for a predetermined time. The predetermined time may be preset by a manufacturer of the device 1000 or may be set to be changed by a user. However, the selection criterion may be changed according to one or more exemplary embodiments and is not limited to the example described above.

In operation S360, the device 1000 may select the item satisfying the selection criterion as an item to be moved into the container object.

In operation S370, when the user input continues, the device 1000 may return to operation S320 and may receive a new user input. For example, when the device 1000 does not determine that the user input is ended, the device 1000 may receive the new user input. However, when the user input is ended, the device 1000 may move the selected item into the container object.

When the device 1000 selects the item to be moved, even while the user input continues, the device 1000 may directly move the selected item into the container object. According to one or more exemplary embodiments, after the user input is ended, the device 1000 may move selected items into the container object at a time. In this case, before the device 1000 moves the selected items to the container object, the device 1000 may additionally receive a user input of confirming the selected items. For example, the device 1000 may display, on a screen, a message inquiring whether items currently selected are allowed to move into the container object and may receive the user input of confirming the currently selected items as the items to be moved into the container object.

Figure 4:
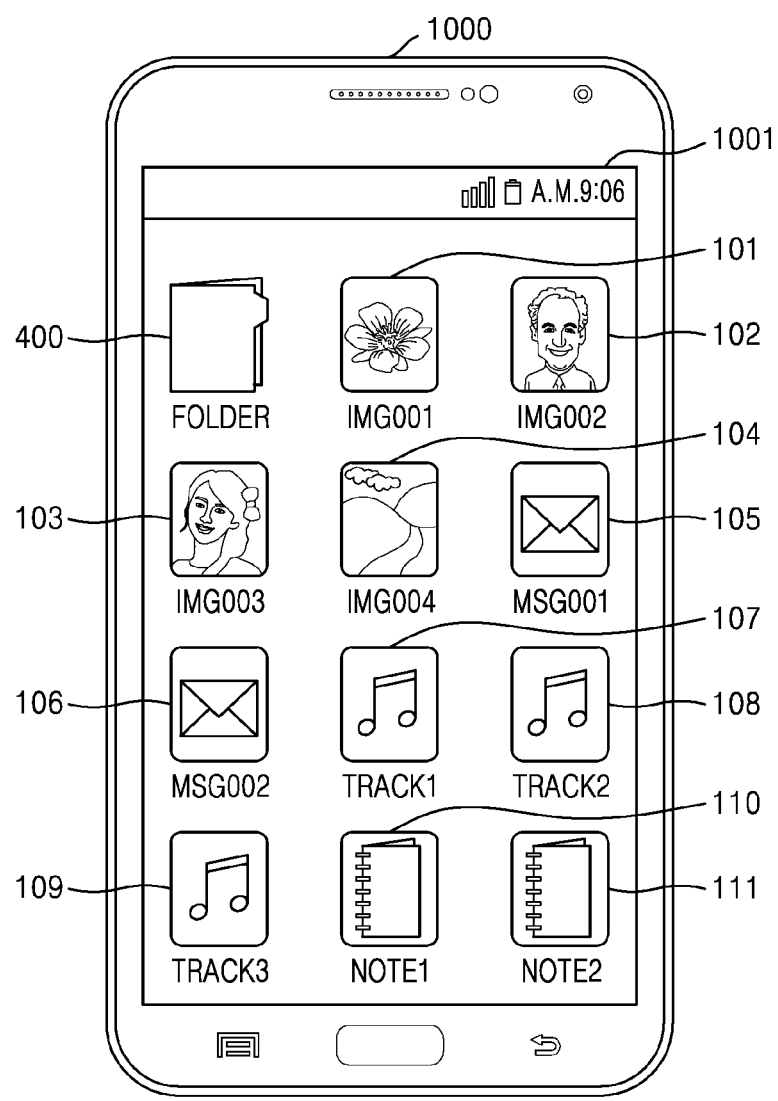
FIG. 4 is a diagram of a screen of a device according to an exemplary embodiment.

FIG. 4 is a diagram of a screen 1001 of a device 1000 according to an exemplary embodiment.

Referring to FIG. 4, the device 1000 may display a container object 400 and a plurality of items 101-111 on the screen 1001. As illustrated in FIG. 4, the container object 400 may be a folder, but is not limited thereto.

The plurality of items displayed on the screen 1001 may be an object displayed on the screen 1001 of the device 1000 to execute an application, an image file, and/or a text file and may be, for example, an icon, an image, or a text. For example, referring to FIG. 4, the plurality of items may include items 101 to 104 related to images, items 105 and 106 related to messages such as short message service (SMS) messages or e-mails, items 107 to 109 related to sounds, and items 110 and 111 related to texts but are not limited thereto.

As illustrated in FIG. 4, the items 101 to 111 displayed on the screen 1001 may be displayed having a rectangular shape but are limited thereto.

In response to a user input of touching an item, the device 1000 may execute a file corresponding to the touched item. For example, in the case of the items 110 and 111 related to the texts, in response to a user input of touching an item, the device 1000 may open a text file corresponding to the touched item. In addition, in the case of the items 105 and 106 related to the e-mails, in response to a user input of touching an item, the device 1000 may open an application corresponding to the touched item.

Furthermore, in the device 1000, a software screen (for example, a home screen, a lock screen, or an application screen) may include a plurality of pages, and the container object 400 and a plurality of items may be displayed on each of the pages. For example, a plurality of items displayed on the first page may be different from a plurality of items displayed on the second page. The device 1000 may display one page or may display other pages in response to a user input of turning the displayed page.

Figure 5:
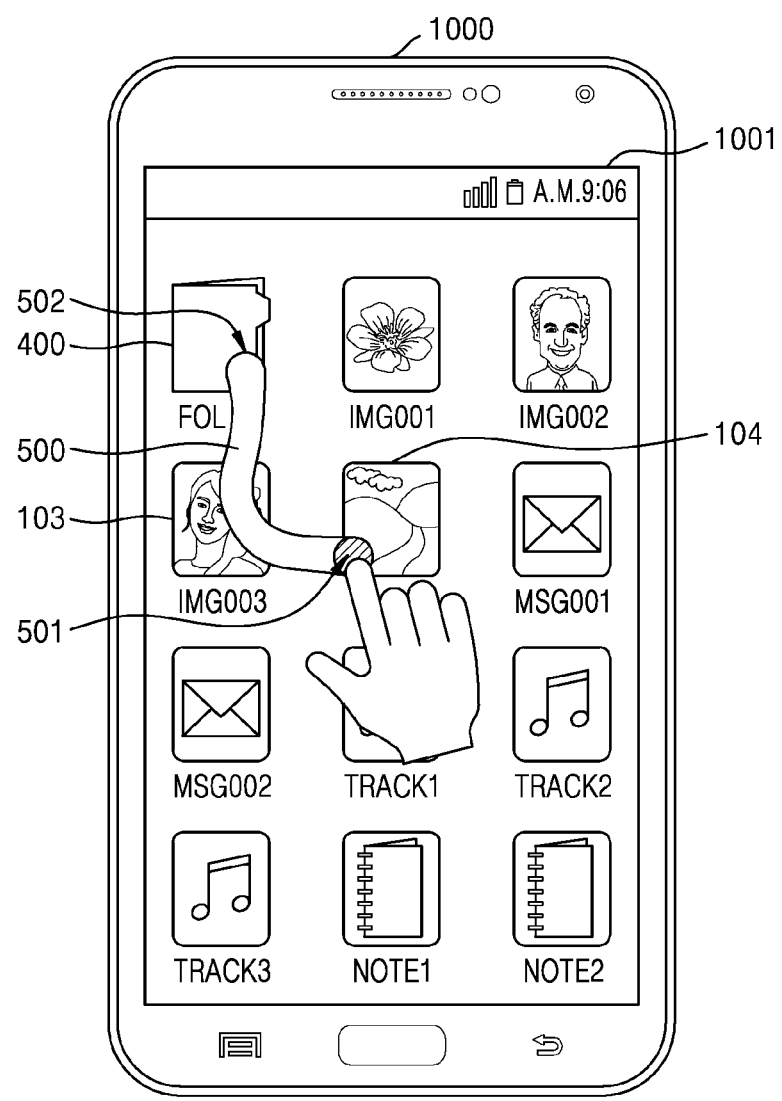
FIG. 5 is a diagram for describing an example in which a device moves an item into a container object, according to another exemplary embodiment.

FIG. 5 is a diagram for describing an example in which a device 1000 moves an item into a container object 400, according to another exemplary embodiment.

Referring to FIG. 5, the device 1000 may display a connector 500 on a screen 1001 in response to a user input of touching and dragging the container object 400, the connector 500 being connected from the container object 400 to a current position 501 of the user input. At this time, the connector 500 may be displayed along a movement path of the user input. For example, the connector 500 may be displayed along a locus of a touching and dragging input. Referring to FIG. 5, the device 1000 may receive the user input of touching the container object 400, dragging the container object 400 downward toward an item 103, and dragging the container object 400 rightward toward an item 104. As illustrated in FIG. 5, the connector 500 may be displayed along a locus of the touching and dragging input.

In addition, the device 1000 may change a shape of the connector 500 in response to the user input. For example, the device 1000 may change a length of the connector 500 such that a distance between two ends 501 and 502 of the connector 500 is minimized, but the exemplary embodiment is not limited thereto.

In addition, the device 1000 may determine whether there is an item located within a predetermined distance from the end 501 of the connector 500. The predetermined distance may be changed by a user setting.

In addition, the device 1000 may move the item, which is located within the predetermined distance from the end 501 of the connector 500, into the container object 400. According to one or more exemplary embodiments, the device 1000 may move only an item overlapping the end 501 of the connector 500 into the container object 400.

Figure 6A:
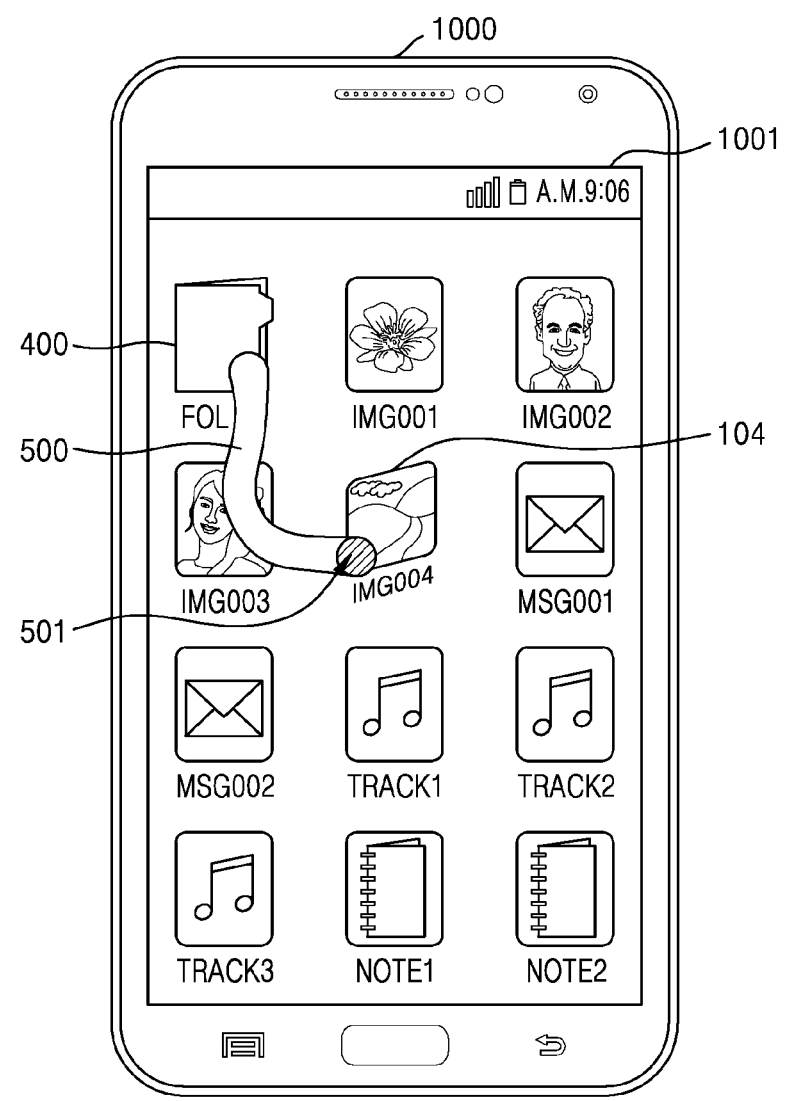
FIGS. 6A to 6C are diagrams for describing an example in which a device distinguishably displays an item to be moved into a container object, according to one or more exemplary embodiments.
Figure 6B:
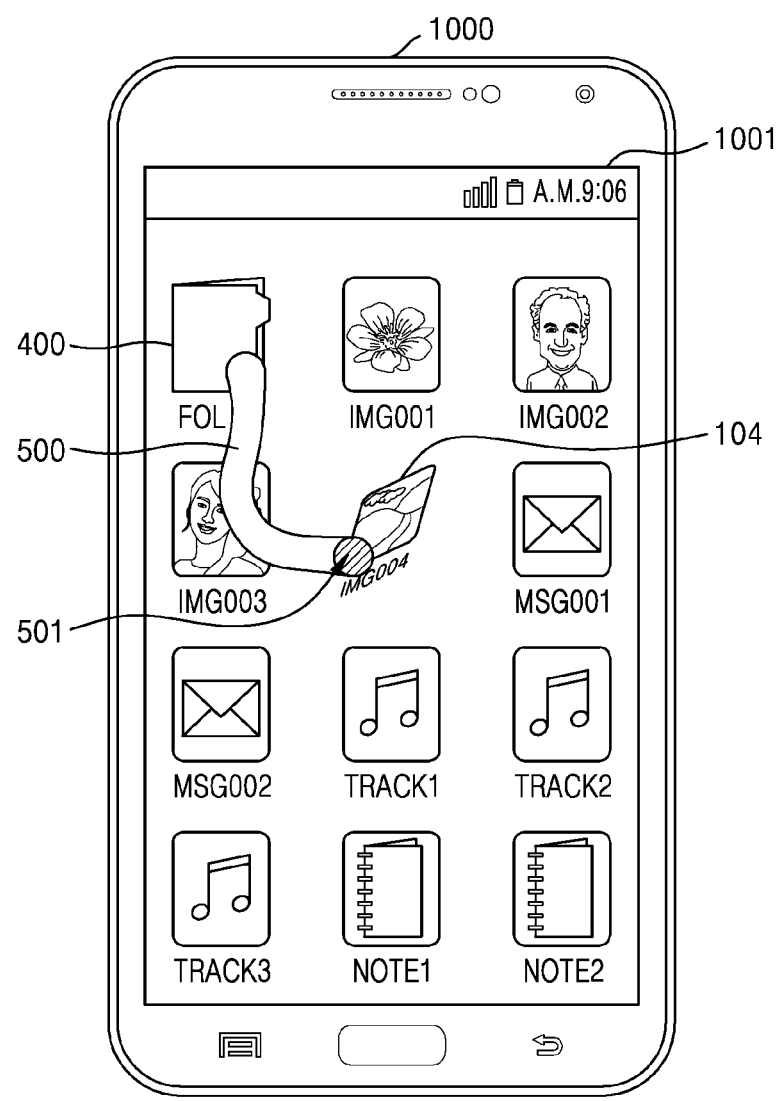
Figure 6C:
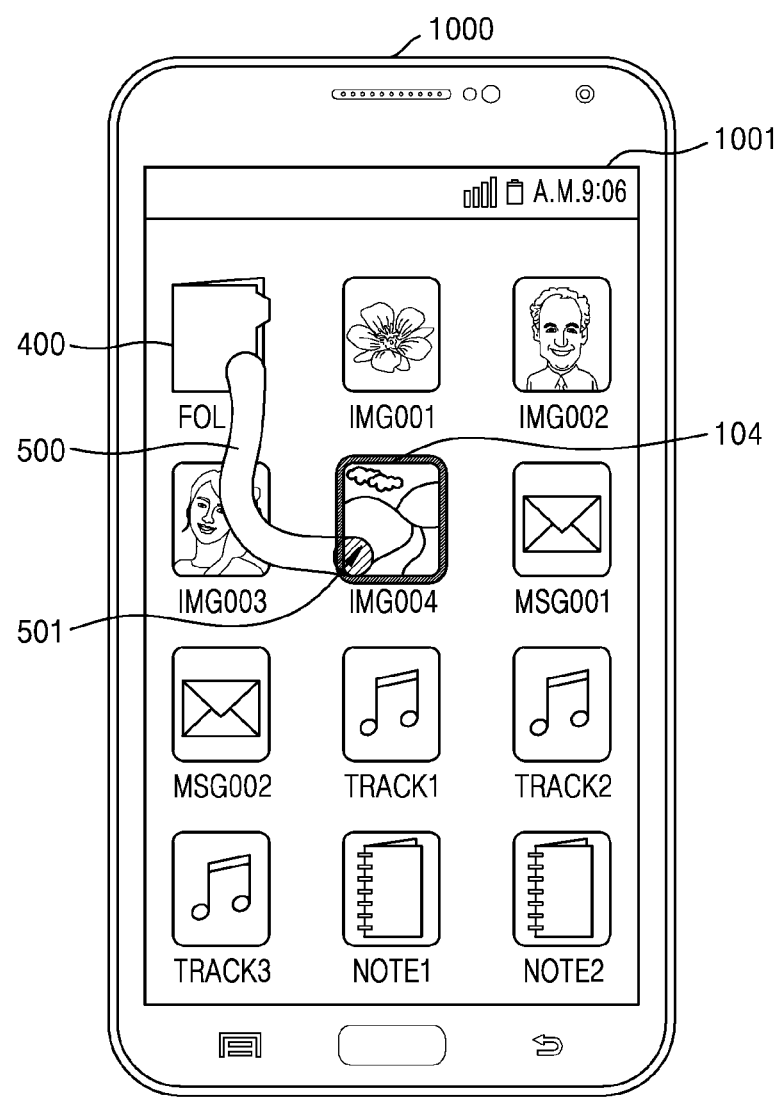

FIGS. 6A to 6C are diagrams for describing an example in which a device 1000 distinguishably displays an item to be moved into a container object 400, according to one or more exemplary embodiments.

The device 1000 may display the item to be moved into the container object 400 of a plurality of items in such a manner that it is distinguishable from other items. For example, as illustrated in FIGS. 6A and 6B, the device 1000 may change a shape of an item 104 to be moved into the container object 400 and may display the changed shape. The device 1000 may display the item 104 to be moved into the container object 400 in such a manner that it appears to shake on a screen. However, the distinguished displaying is not limited to the examples described above.

In addition, as illustrated in FIG. 6C, the device 1000 may highlight the item 104 to be moved into the container object 400.

Furthermore, when the device 1000 selects the item 104 to be moved to the container object 400, the device 1000 may separately use a non-visual effect or may use the non-visual effect together with the visual effects described above.

The non-visual effect may include, for example, a haptic effect or a sound effect. As a user input starts, the device 1000 may vibrate, allowing a user touching the device to feel a vibration. At this time, as the end 501 of the connector 500 approaches the item 104, an intensity of the vibration may increase.

The device 1000 may use various non-visual effects in addition to the haptic effect and the sound effect, but is not limited to the example described above FIG. 7 is a diagram for describing an example in which a device 1000 displays a state in which an item 104 is moved into a container object 400, according to an exemplary embodiment.

Figure 7:
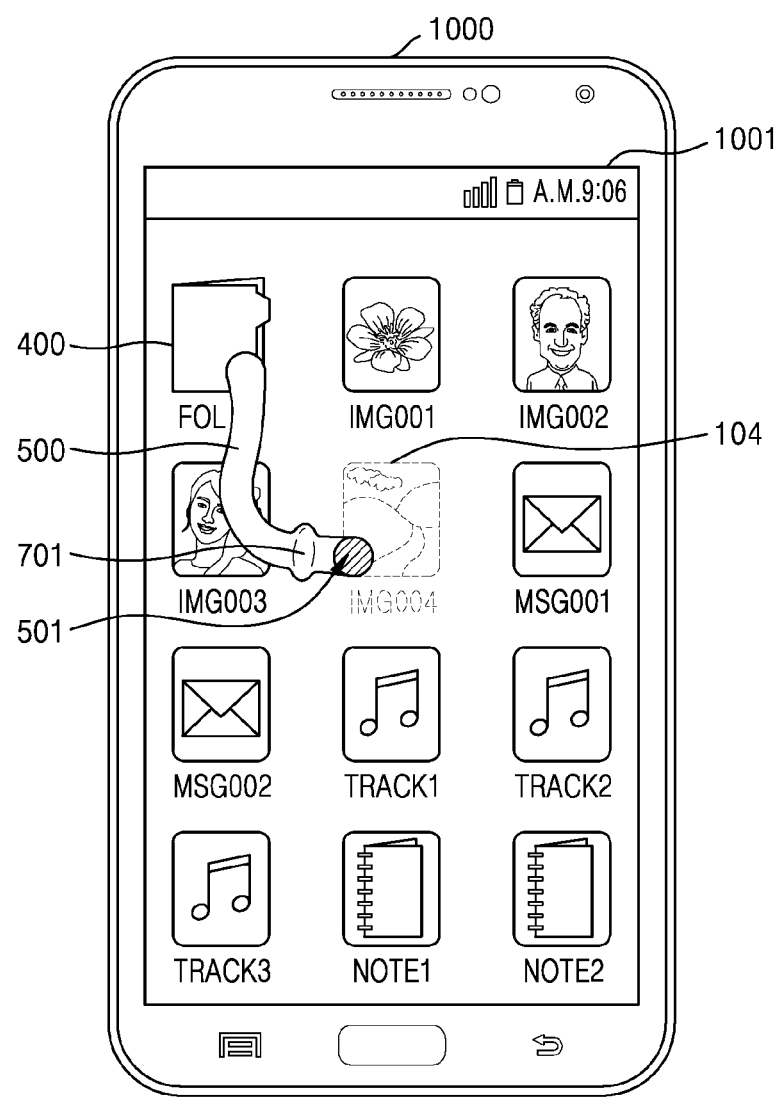
FIG. 7 is a diagram for describing an example in which a device displays a state in which an item is moved into a container object, according to an exemplary embodiment.

As illustrated in FIG. 7, the device 1000 may display the state in which the selected item 104 is moved into the container object 400 along a connector 500. For example, the selected item 104 may be displayed, through an animated effect, as an oval shape 701 that is moved into the container object 400 along the connector 500.

In addition, as the item 104 is moved into the container object 400, the device 1000 may faintly display the item 104. Accordingly, a user may confirm what the item 104 moved into the container object 400 is. According to one or more exemplary embodiments, the device 1000 may not display the item 104 moved into the container object 400 on a screen 1001.

Figure 8A:
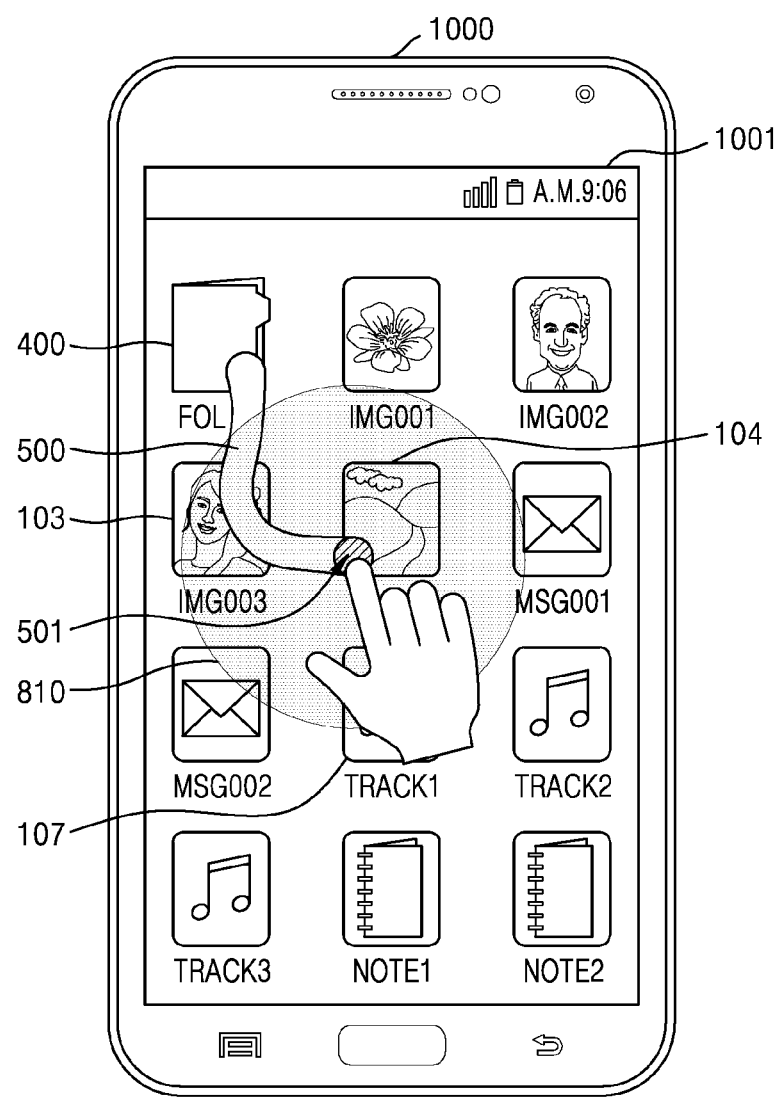
FIG. 8A is a diagram for describing an example in which a device determines the number of items to be moved into a container object based on a strength of a user input, according to an exemplary embodiment.

FIG. 8A is a diagram for describing an example in which a device 1000 moves items into a container object 400 according to an intensity of a user input, according to another exemplary embodiment. The intensity of the user input may be an intensity of a pressure applied to a screen 1001 of the device 1000 by the user input or may be a time in which the user input is located at a point 501 (end of a connector 500) on the screen 1001.

For example, when the user input is located at the point 501 on the screen 1001 for a predetermined time or more, the device 1000 may move a plurality of items, which are located within a predetermined distance from the end 501 of the connector 500, into the container object 400. As the user input is located at the point 501 on the screen 1001 for the predetermined time or more, the device 1000 may display a selection region 810 capable of moving the plurality of items into the container object 400 at a time. At this time, the longer the time the user input is located at the point 501, the larger the selection region 810 may be.

In addition, when the pressure applied to the screen 1001 of the device 1000 by the user input increases, the device 1000 may display the selection region 810 capable of moving the plurality of items into the container object 400 at a time.

Referring to FIG. 8A, when the user input is located in the vicinity of an item 104 for a predetermined time or more, the device 1000 may display the selection region 810 on the basis of the point 501 at which the user input is located. As illustrated in FIG. 8A, the selection region 810 may have a circular shape, but is not limited thereto.

The device 1000 may move items included in the selection region into the container object 400 at one time. At this time, each of the items to be moved into the container object 400 may be an item, all portions of which are included in the selection region 810. Alternatively, according to one or more exemplary embodiments, an item, a predetermined portion or more of all portions of which is included in the selection region 810, may be moved into the container object 400. For example, referring to FIG. 8A, when the device 1000 selects an item, about 50% or more of all portions of which are included in the selection region 810, the device 1000 may move three items 103, 104, and 107 into the container object 400.

Figure 8B:
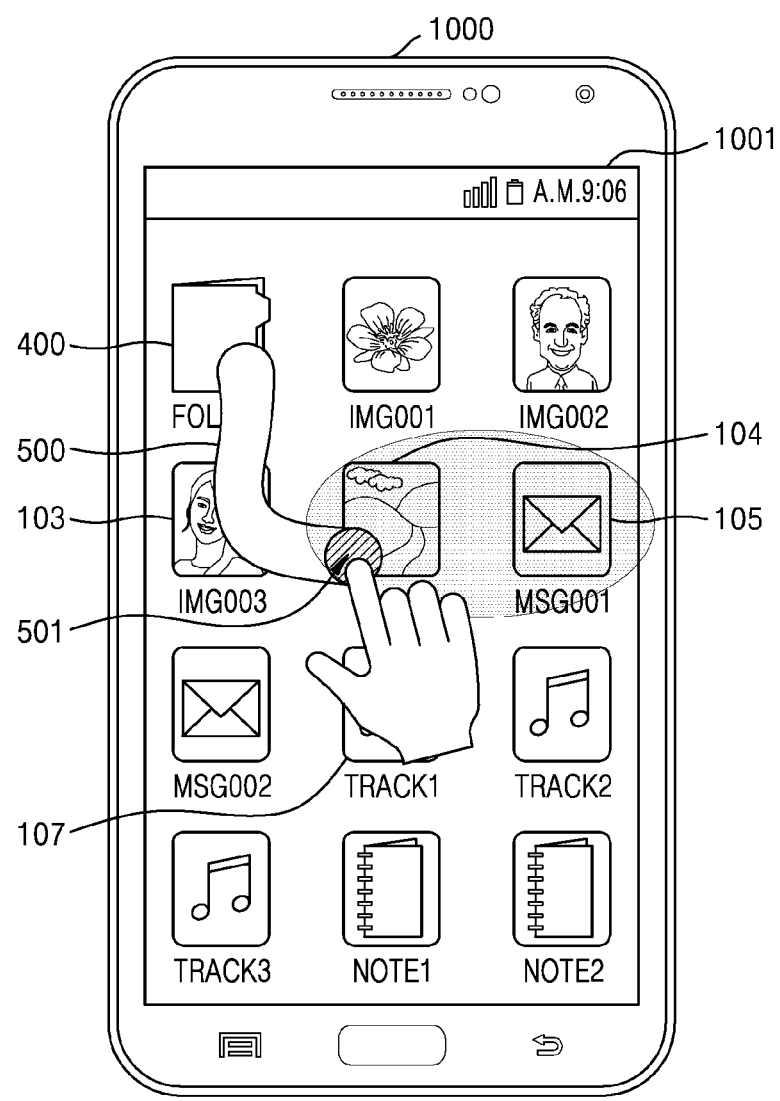
FIG. 8B is a diagram for describing an example in which a device determines the number of items to be moved into a container object based on a thickness of a connector, according to an exemplary embodiment.

FIG. 8B is a diagram for describing an example in which a device 1000 determines the number of items to be moved into a container object 400 based on a thickness of a connector 500, according to another exemplary embodiment.

The device 1000 may variably set the thickness of the connector 500 according to a user setting. A plurality of items may be simultaneously moved into the container object 400 by setting the connector 500 to have a large thickness.

For example, referring to FIG. 8B, the device 1000 may move all of an item 104 located within a predetermined distance from an end 501 of the connector 500 and an item 105 located adjacent to the item 401, into the container object 400.

The adjacent item 105 may be selected based on a direction in which the end 501 of the connector 500 faces. Referring to FIG. 8B, the end 501 of the connector 500 faces rightward. Therefore, the device 1000 may move the item 104, which is located within the predetermined distance from the end 501 of the connector 500, and the item 105, which is adjacent to the item 401, into the container object 400. However, the selecting of an adjacent item is not limited to the example described above.

Figure 9A:
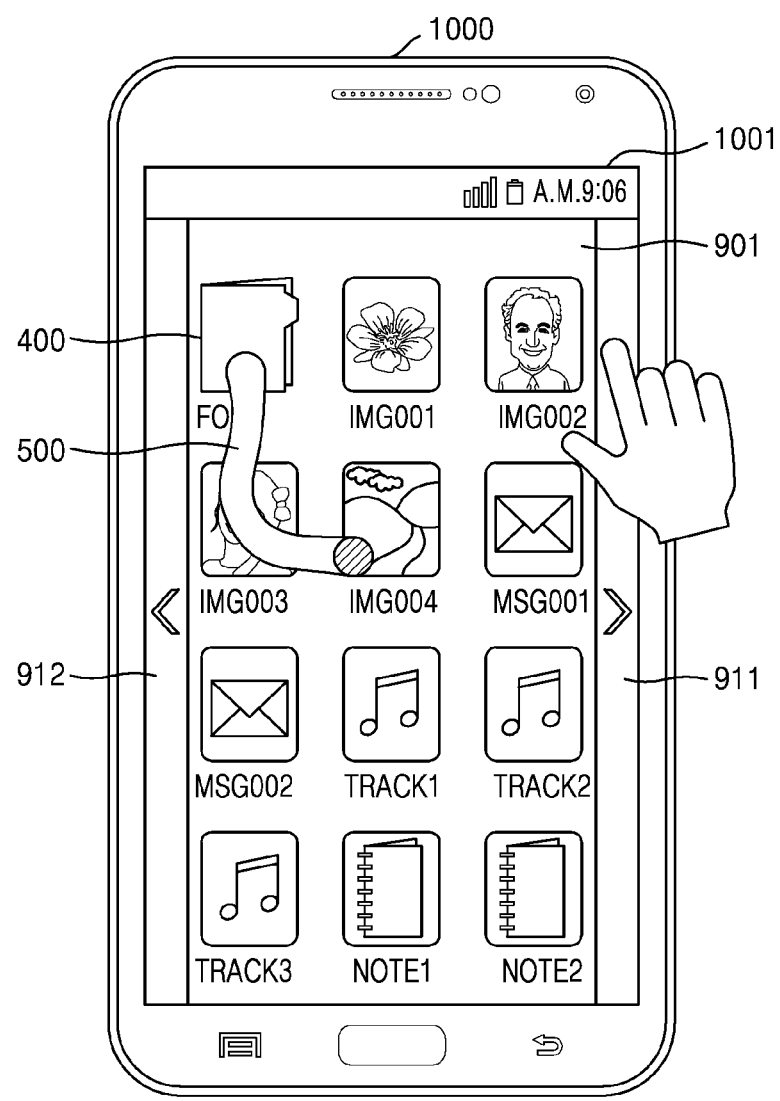
FIGS. 9A and 9B are diagrams for describing an example in which a device turns a page, according to one or more exemplary embodiments.
Figure 9B:
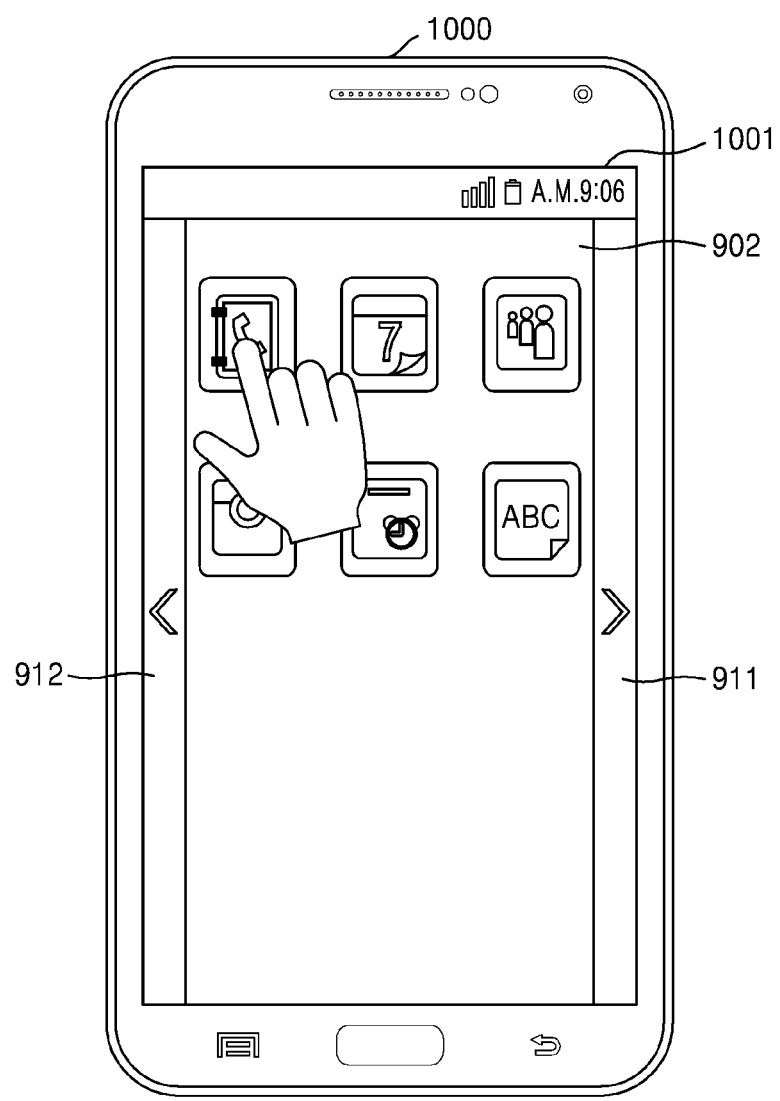

FIGS. 9A and 9B are diagrams for describing an example in which a device 1000 turns a page, according to one or more exemplary embodiments.

FIG. 9A is a diagram of a first page 901 displaying a container object 400 and a plurality of items on a screen 1001 of the device 1000.

When a user input is located at an edge of the first page 901, the device 1000 may display page turning regions 911 and 912 at the right side and the left side of the first page 901, respectively.

When the user input is located at the page turning regions 911 and 912 for a predetermined time, the device 1000 may display other pages adjacent to the first page 901 on the screen 1001. When the user input is located at the page turning region 911 at the right side of the first page 901, the device 1000 may display a second page 902 adjacent to the right side of the first page 901.

FIG. 9B is a diagram of the second page 902 on the screen 1001 of the device 1000. Referring to FIG. 9B, the second page 902 may display a plurality of items different from the plurality of items displayed on the first page 901.

In the same manner as illustrated in FIG. 9A, when the user input is located at the page turning region 912 at the left side of the second page 902 for a predetermined time, the device 1000 may re-display the first page 901 on the screen 1001.

Also, when the user input is located at the page turning region 912 at the left side of the first page 901, the device 1000 may display a third page adjacent to the left side of the first page 901.

Figure 10:
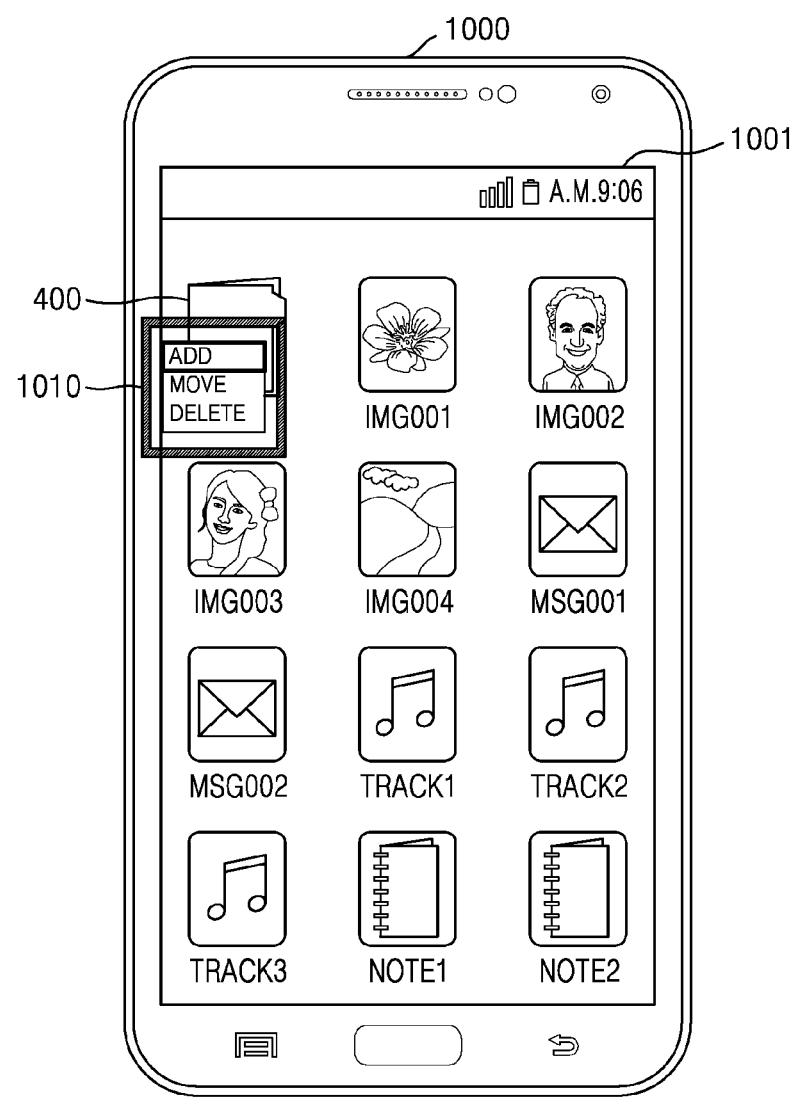
FIG. 10 is a diagram for describing an example in which a device displays a menu for managing a container object, according to an exemplary embodiment.

FIG. 10 is a diagram for describing an example in which a device 1000 displays a menu 1010 for managing a container object 400, according to an exemplary embodiment.

When the device 1000 receives a user input of touching the container object 400 for a predetermined time, the device 1000 may display the menu 1010 for managing the container object 400.

Referring to FIG. 10, the menu 1010 may include options such as "ADD", "MOVE", or "DELETE", but is not limited thereto.

The device 1000 may select an item to be moved into the container object 400 in response to a user input of selecting the "ADD" option. In addition, the device 1000 may move the container object 400 to a new position on a screen 1001 in response to a user input of selecting the "MOVE" option. Furthermore, the device 1000 may delete the container object 400 in response to a user input of touching the "DELETE" option.

As illustrated in FIG. 10, the device 1000 may display the menu 1010 in a list form, but exemplary embodiments are not limited thereto.

Figure 11:
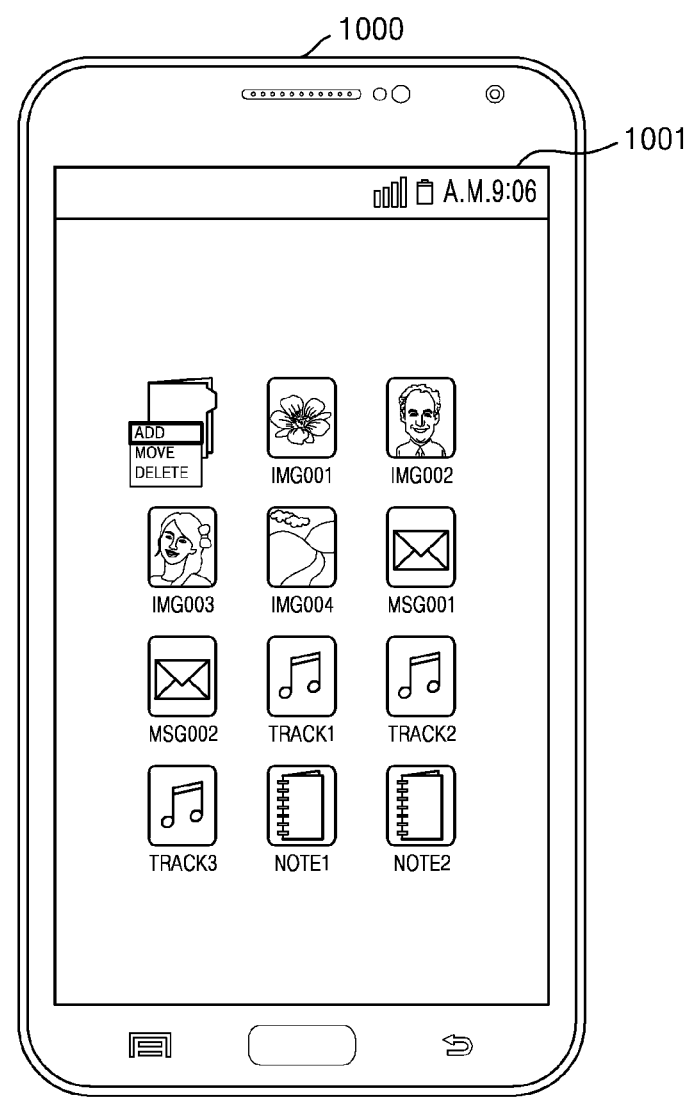
FIG. 11 is a diagram for describing an example in which a device displays a container object and a plurality of items in a small size, according to an exemplary embodiment.

FIG. 11 is a diagram for describing an example in which a device 1000 displays a container object 400 and a plurality of items in a small space, according to an exemplary embodiment.

Referring to FIG. 11, the device 1000 may display the plurality of items in a small size on a screen 1001 in response to a user input of selecting "ADD". Accordingly, the device 1000 may allow a user to easily perform an input of touching and dragging the container object 400.

The container object 400 and the items to be moved into the container object 400 may be displayed on different pages. For example, the container object 400 and the items to be moved into the container object 400 may be displayed on a first page and a second page, respectively.

In this case, to receive the user input, the device 1000 turns the first page to the second page. At this time, when the items are displayed in a smaller size on the screen 1001, the user input of touching the container object 400 and dragging the container object 400 to items to be moved may be easily performed.

When the items to be moved are located at an edge of the page, the user input of touching the container object 400 and dragging the container object 400 to the items to be moved may not be easily performed. At this time, when the items are displayed in a small size on the screen 1001, the items located on the edge of the page may also be easily selected.

Figure 12:
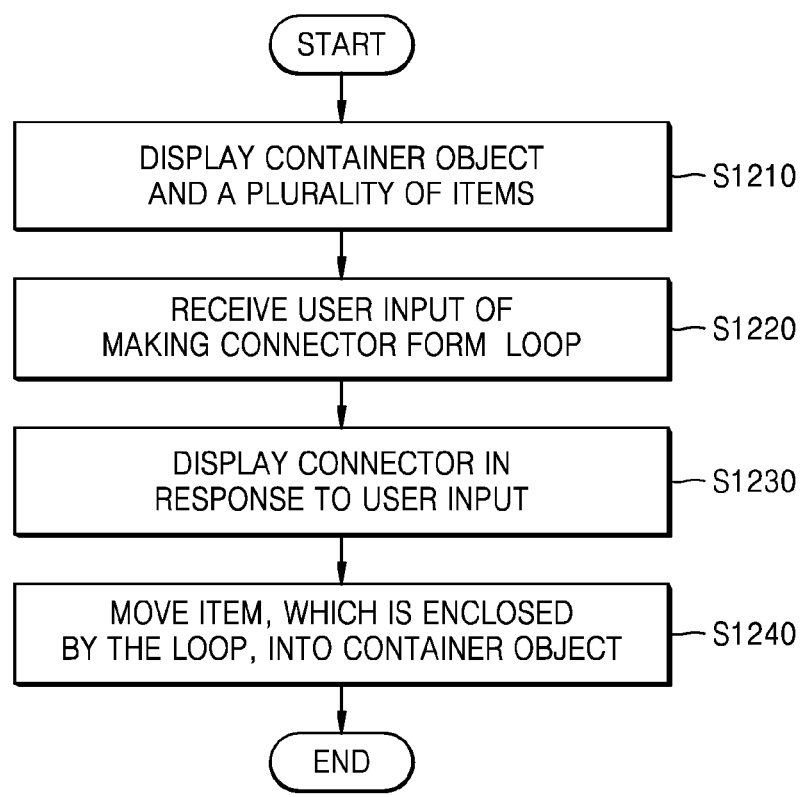
FIG. 12 is a flowchart of a method of moving a plurality of items into a container object in a device, according to another exemplary embodiment.

FIG. 12 is a flowchart of a method of moving a plurality of items into a container object in a device 1000, according to another exemplary embodiment.

In operation S1210, the device 1000 may display the container object and the plurality of items on a screen.

In operation S1220, the device 1000 may receive a user input of making a connector form a loop. At this time, the user input may form the loop to enclose items to be moved into the container.

In operation S1230, the device 1000 may display the connector connected from the container object to a current position of the user input in response to the user input. The device 1000 may display the connector along a locus of a touching and dragging input. Therefore, when the user input forming the loop is received, the connector forming the loop may be displayed.

In addition, the device 1000 may change a shape of the connector during the receiving of the user input.

In operation S1240, the device 1000 may move the items enclosed by the loop into the container object. At this time, each of the items enclosed by the loop may be an item, all portions of which are enclosed by the loop. Alternatively, each of the items determined to be enclosed by the loop may have a predetermined portion or more of all portions of which is enclosed by the loop.

For example, the device 1000 may move only items which are entirely enclosed by the loop, into the container object. According to one or more exemplary embodiments, the device 1000 may move items partially enclosed by a predetermined portion or more of the loop, into the container object. The predetermined portion may be defined as a predetermined percentage of a total area of an item. In a case of a three-dimensional user interface (3D UI), the predetermined portion may be defined as a percentage of a total volume of an item.

In addition, even if the connector does not completely form a closed loop, when the device 1000 receives a user input satisfying a predetermined condition, the device 1000 may automatically complete the closed loop. For example, although a portion of the loop formed by the connector is opened, when an end of the connector approaches other portions of the connector within a predetermined distance, the device 1000 may make the connector automatically form the loop. According to one or more exemplary embodiments, when the end of the connector comes into contact with or overlaps other portions of the connector, the device 1000 may make the connector automatically form the loop. Therefore, the user may more conveniently select the items to be moved into the container object.

Figure 13:
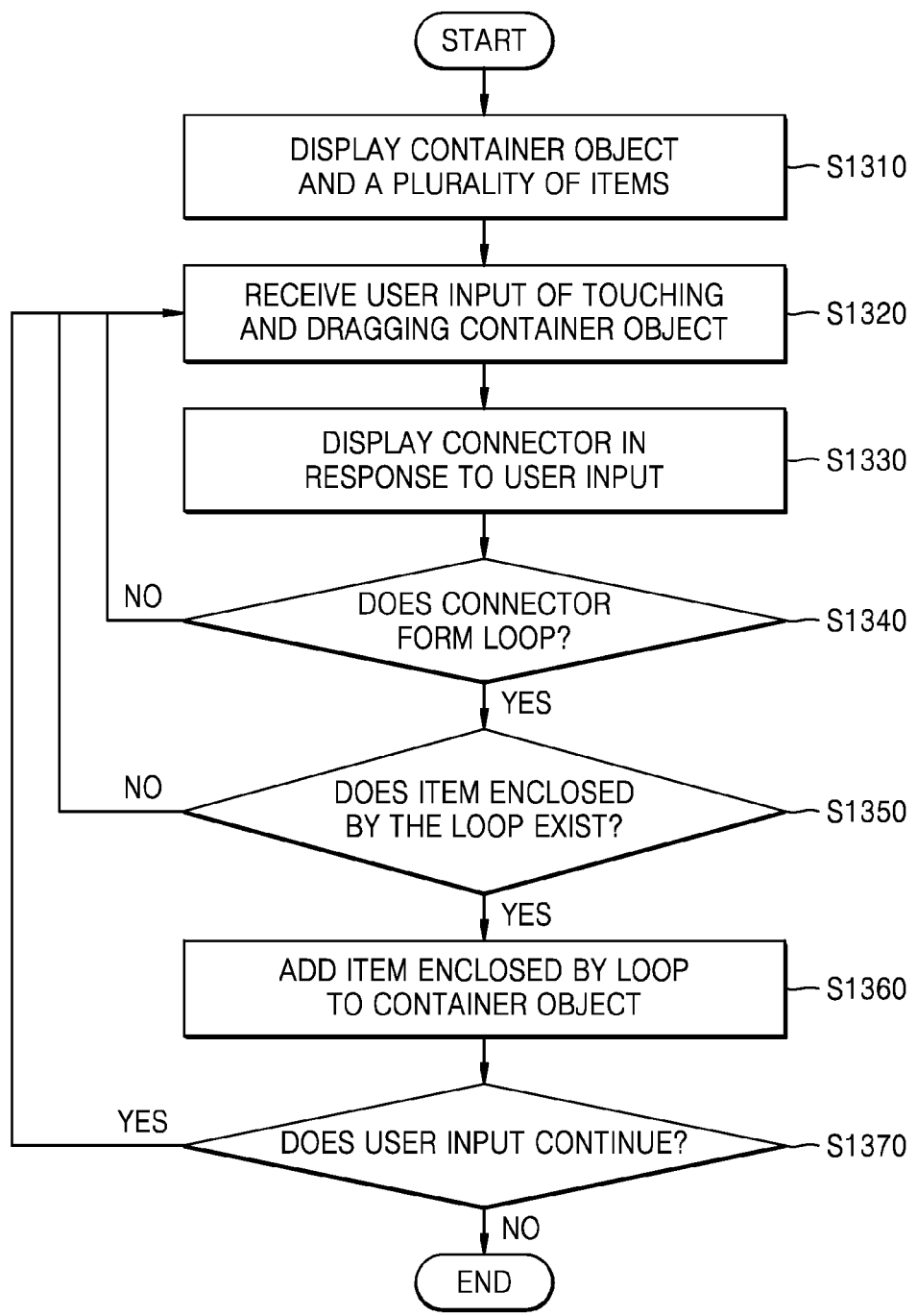
FIG. 13 is a flowchart of a method of moving a plurality of items into a container object in a device, according to another exemplary embodiment.

FIG. 13 is a flowchart of a method of moving a plurality of items into a container object in a device 1000, according to another exemplary embodiment.

FIG. 13 is a flowchart for describing an exemplary embodiment. Therefore, a redundant description thereof will be omitted. Because operations S1310 to S1330 are substantially the same as operations S310 to S330 of FIG. 3, a redundant description thereof will be omitted.

In operation S1340, the device 1000 may determine whether the connector displayed in response to the user input forming a loop.

In operation S1350, the device 1000 may determine whether one or more items are enclosed by the loop.

In operation S1360, the device 1000 may move the items enclosed by the loop into the container object. However, when there is no item enclosed by the loop, the device 1000 may return to operation S1320 and may receive a new user input.

In operation S1370, the device 1000 may determine whether the user input continues. When the user input continues, the device 1000 may receive a new user input and may additionally select items to be moved into the container object. When the user input ends, the device 1000 may move the selected items into the container object.

Figure 14:
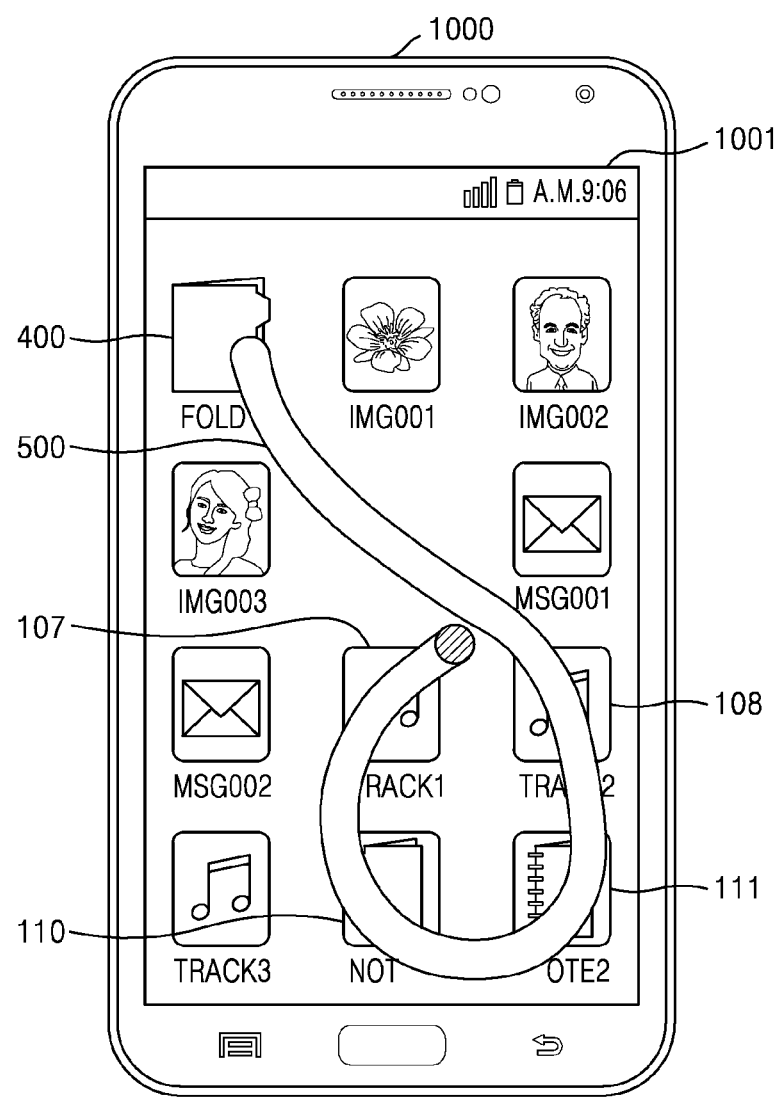
FIG. 14 is a diagram for describing an example in which a device receives a user input forming a loop, according to an exemplary embodiment.

FIG. 14 is a diagram for describing an example in which a device 1000 receives a user input forming a loop, according to an exemplary embodiment.

The device 1000 may receive a user input of touching the container object 400 and forming the loop. In addition, the device 1000 may display a connector 500 having a loop shape in response to the user input. At this time, the connector 500 may indicate a plurality of items.

The device 1000 may move an item indicated by the loop into the container object 400. According to one or more exemplary embodiments, the device 1000 may move items entirely or partially enclosed by the loop into the container object 400.

Referring to FIG. 14, the connector 500 forming the loop encloses a portion of each of items 107, 108, 110, and 111. For example, when 60% or more of an item is enclosed by the loop, the item is moved into the container object 400. In this example, the device 1000 may move the items 107 108, 110 and 111 into the container object 400.

Figure 15:
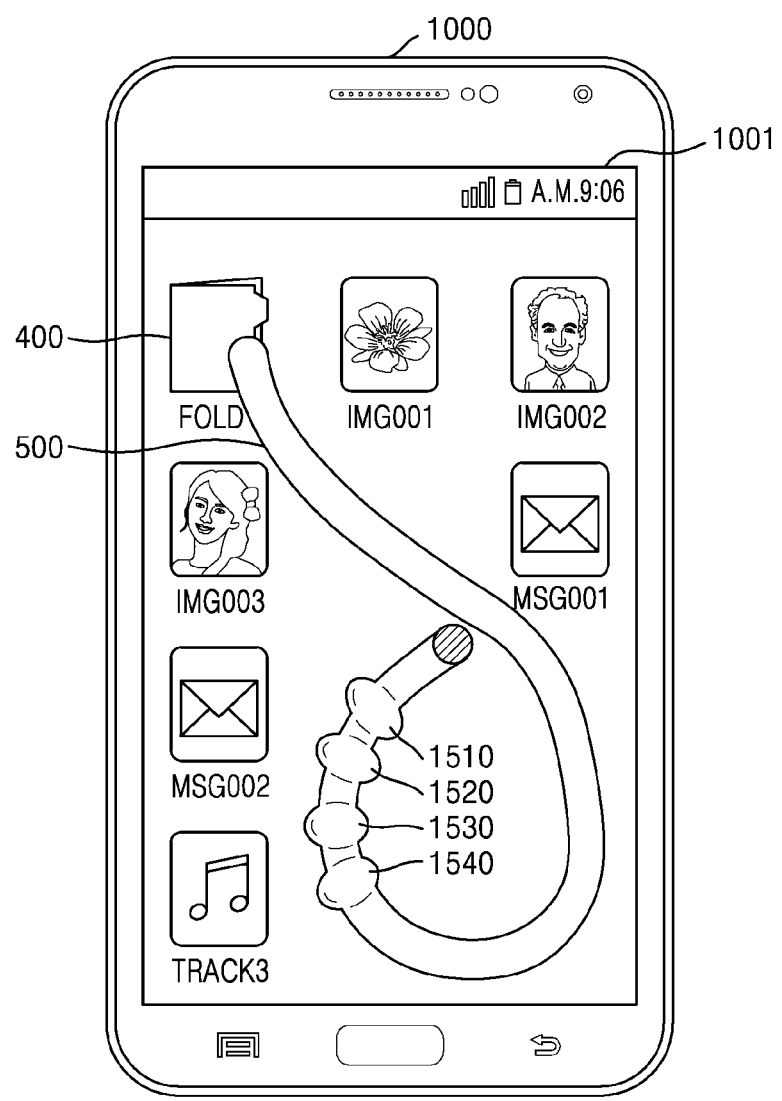
FIG. 15 is a diagram for describing an example in which a device distinguishably displays a process of moving items into a container object, according to another exemplary embodiment.

FIG. 15 is a diagram for describing an example in which a device 1000 distinguishably displays a state in which items are moved into a container object 400, according to another exemplary embodiment.

Referring to FIG. 15, the device 1000 may display a state in which the items 107, 108, 110 and 111 are moved into the container object 400 along a connector 500. For example, as illustrated in FIG. 15, the device 1000 may display a state in which four oval shapes 1510 to 1540 are moved into the container object 400 along the connector 500, but the exemplary embodiment is not limited thereto. The four oval shapes 1510 to 1540 may respectively mean the items 107, 108, 110, and 111, which are moved into the container object 400.

At this time, as described in FIG. 15, the device 1000 may stop displaying items 107, 108, 119, and 111, which are moved into the container object 400. According to one or more exemplary embodiments, the device 1000 may faintly display the items 107, 108, 110, and 111, which are moved into the container object 400.

Figure 16A:
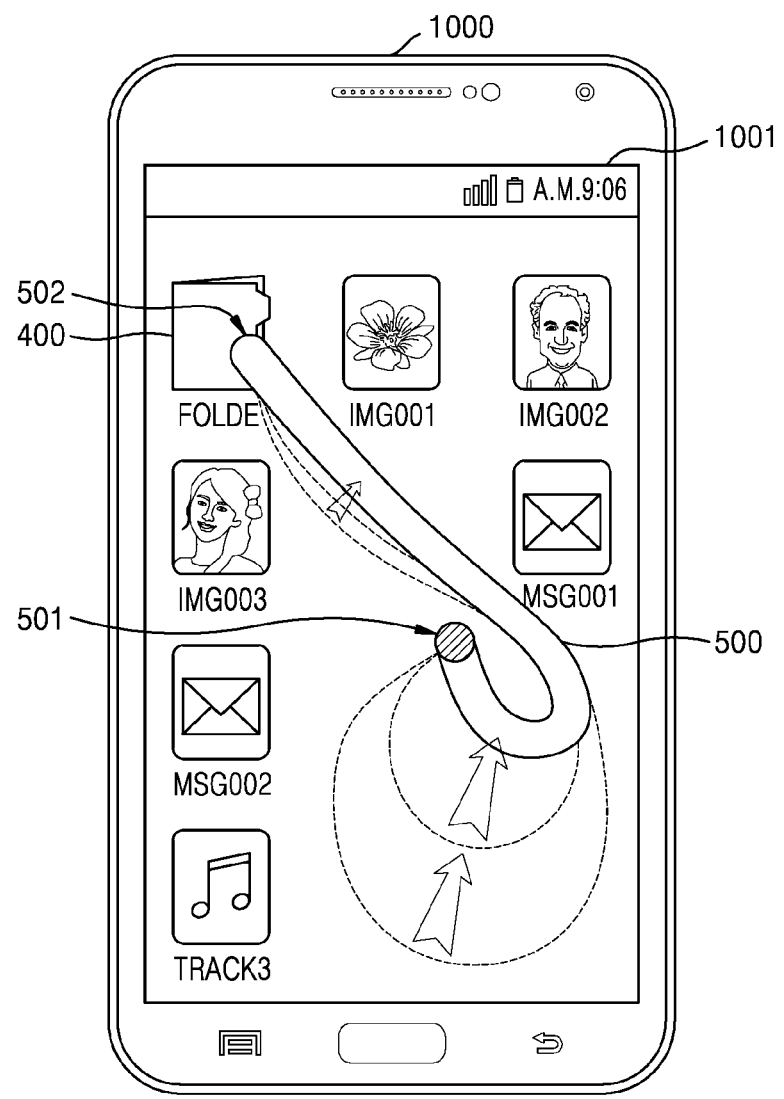
FIGS. 16A and 16B are diagrams for describing an example in which a device changes a shape of a connector, according to one or more exemplary embodiments.
Figure 16B:
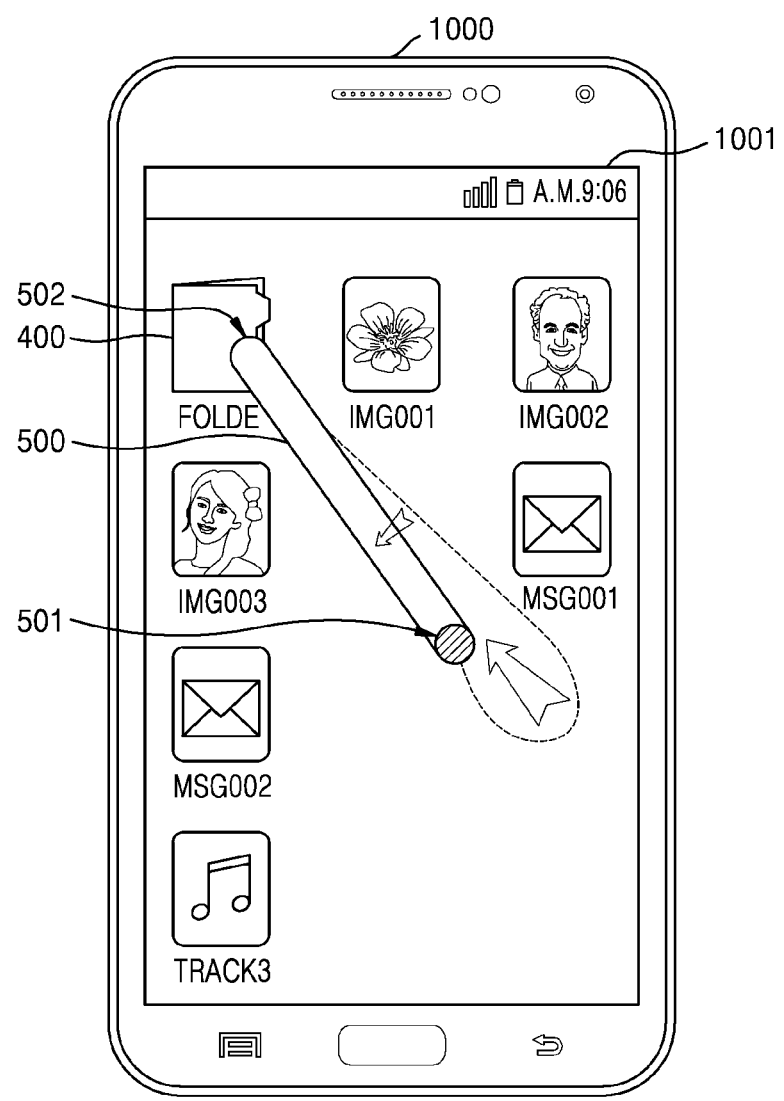

FIGS. 16A and 16B are diagrams for describing an example in which a device 1000 changes a shape of a connector 500, according to one or more exemplary embodiments.

Referring to FIG. 16, the device 1000 may receive a user input forming a loop.

The device 1000 may display the connector 500 connected from a container object 400 to a current position of the user input in response to the user input. The device 1000 may display the connector 500 along a movement path of the user input. For example, the connector 500 may be displayed along a locus of a touching and dragging input. Therefore, the connector 500 may be displayed in various shapes depending on the movement path of the user input.

At this time, the device 1000 may change the shape of the connector 500 while receiving of the user input. The device 1000 may change the shape of the connector 500 such that a distance between two ends 501 and 502 of the connector 500 is shortened. For example, as illustrated in FIG. 16A, the device 1000 may gradually reduce a size of the loop, thereby decreasing the distance between the two ends 501 and 502 of the connector 500.

When the user input is located at the same position for a predetermined time or more, the device 1000 may change the shape of the connector 500 such that the distance between the two ends 501 and 502 of the connector 500 is minimized. In this case, as described in FIG. 16B, the device 1000 may change the shape of the connector 500 into a shape of a straight line that connects the two ends 501 and 502 of the connector 500.

Accordingly, when the user input continues at the same location for a predetermined time or more, the device 1000 may prevent the connector 500 from occupying a predetermined portion or more of a screen 1001 by changing the shape of the connector 500. In addition, the device 1000 may prevent a loop unintended by a user from being formed and an item unintended by the user from being moved into the container object 400 by changing a length of the connector 500.

Furthermore, the device 1000 may preset a time that is spent to change the shape of the connector 500. A manufacturer of the device 1000 may preprogram a time spent to change the shape of the connector 500 such that the distance between the two ends 501 and 502 of the connector 500 is minimized, or a user may set the time.

For example, the device 1000 allows the user to select the time spent to change the shape of the connector 500 in the range of about 0.5 seconds to 5 seconds. However, the set time is not limited to the example described above.

A short time in changing the shape of the connector 500 may mean that although the connector 500 displayed on the screen 1001 is initially long, and the length of the connector 500 is able to get shorter in a very short time. Therefore, a short time for the device 1000 to change the shape of the connector 500 may correspond to that elasticity of the connector 500 is good.

Figure 17:
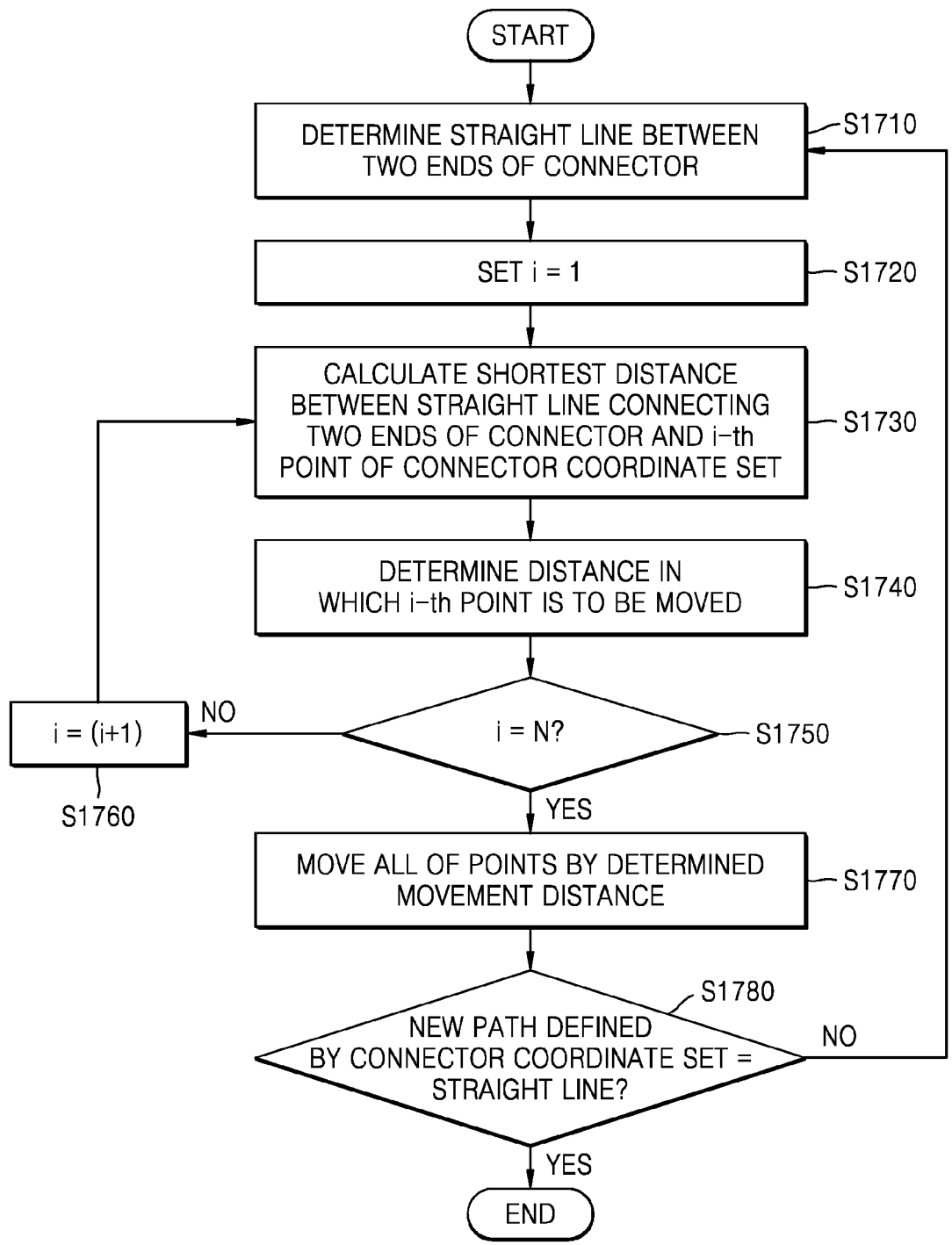
FIG. 17 is a flowchart of a method of changing a shape of a connector in a device, according to an exemplary embodiment.

FIG. 17 is a flowchart of a method of changing a shape of a connector 500 in a device 1000, according to an exemplary embodiment.

A path of the connector 500 on a screen 1001 may be expressed by coordinate values of a plurality of points. The coordinate values constituting the connector 500 will be referred to as a connector coordinate set. In this case, the connector coordinate set may include coordinate values of one or more points exiting along the path of the connector 500. The device 1000 may add, to the connector coordinate set, coordinate values of all of points sensed on the screen 1001 while receiving of a user input. The device 1000 may add, to the connector coordinate set, coordinate values of some of the points sensed on the screen 1001 during the receiving of the user input. For example, the device 1000 may add, to the connector coordinate set, coordinate values of N-th points of the points sensed on the screen 1001 during the receiving of the user input.

In operation S1710, the device 1000 may determine a straight line that connects two ends 501 and 502 of the connector 500 displayed in response to the user input. For example, the straight line may be expressed by a straight line equation having a form of y=a*x+b in a coordinate system defined by the connector coordinate set. However, the expressing is not limited to the straight line equation described above.

In operation S1720, the device 1000 may initialize a value of a counter i to 1.

In operation S1730, the device 1000 may calculate the shortest distance between the straight line connecting the two ends 501 and 502 of the connector 500 and a point corresponding to an i-th coordinate value constituting the connector coordinate set. The shortest distance may be a distance defined when the point corresponding to the i-th coordinate value satisfies the straight line connecting the two ends 501 and 502 of the connector 500 at right angles.

In operation S1740, the device 1000 may determine a distance in which the i-th coordinate value is to be moved, based on the shortest distance calculated in operation S1730. For example, the distance, in which the i-th coordinate value is to be moved, may be determined by a fixed ratio with respect to the shortest distance calculated in operation S1730, but is not limited thereto.

In operation S1750, the device 1000 may determine whether a value of the counter i is equal to N (the number of coordinate values constituting the connector coordinate set). When the value of the counter i is equal to N, it may be considered that a distance in which all of coordinate values are to be moved is calculated. However, when the value of the counter i is not equal to N, the device 1000 may increase the value of the counter i by 1 (operation S1760) and perform operation S1730 on an updated value of the i-th coordinate.

In operation S1770, the device 1000 may move all of the coordinate values toward the straight line connecting two ends 501 and 502 of the connector 500 by the distance determined in operation S1740. The device 1000 may more quickly move the coordinate value as the distance thereof determined in operation S1740 is longer. Therefore, the device 1000 may equally set movement times of all the coordinate values constituting the connector coordinate set.

In operation S1780, the device 1000 may determine whether a new path defined by the connector coordinate set is equal to the straight line that connects the two ends 501 and 502 of the connector 500.

Although the new path is not necessarily a perfect straight line, when the new path is recognized as having a predetermined correlation with a straight line, the device 1000 may end the changing of the shape of the connector 500. For example, the device 1000 may calculate a correlation coefficient between the coordinate values constituting the connector coordinate set and the equation defining the straight line that connects the two ends 501 and 502 of the connector 500. When the calculated correlation coefficient becomes a value of a predetermined critical value or more, the device 1000 may end the changing of the shape of the connector 500. Therefore, it is possible to prevent excessive use of a resource in the device 1000 for changing the shape of the connector 500.

Figure 18:
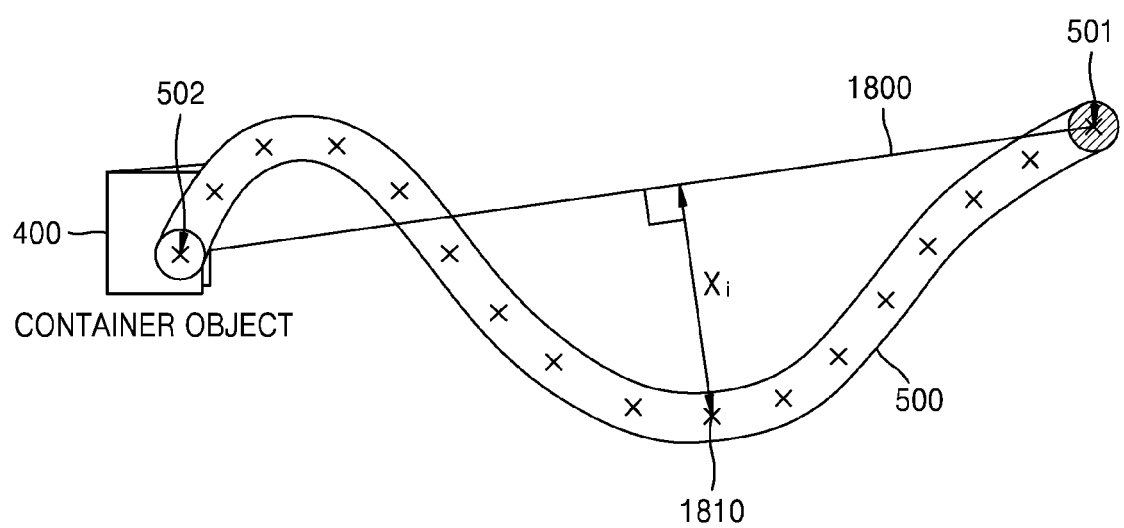
FIG. 18 is a diagram for describing an example in which a device changes a shape of a connector, according to another exemplary embodiment.

FIG. 18 is a diagram for describing an example in which a device 1000 changes a shape of a connector 500, according to another exemplary embodiment.

As illustrated in FIG. 18, a path of the connector 500 may be expressed by a connector coordinate set. At this time, the connector coordinate set may include coordinate values of points marked by "x".

In addition, the device 1000 may determine a straight line 1800 that connects two ends 501 and 502 of the connector 500. The device 1000 may change the shape of the connector 500 by moving the coordinate values constituting the connector coordinate set by a predetermined distance.

For example, referring to FIG. 18, the device 1000 may calculate a shortest distance Xi between the straight line 1800 and a point 1810 corresponding to an i-th coordinate value of the coordinate values constituting the connector coordinate set. At this time, the shortest distance Xi may be a distance defined when the point 1810 corresponding to the i-th coordinate value satisfies the straight line 1800 at right angles. The device 1000 may determine a distance in which the i-th coordinate value is to be moved, based on the shortest distance Xi. For example, the distance, in which the i-th coordinate value is to be moved, may be defined by a ration with respect to the shortest distance $X_i$, but is not limited thereto.

The device 1000 may calculate the shortest distance between the straight line 1800 and each of the coordinate values and calculate a distance in which each of the coordinate values is to be moved, with respect to all of the coordinate values constituting the connector coordinate set. The device 1000 may move all of the coordinate values constituting the connector coordinate set toward the straight line 1800 by the calculated distance. Therefore, when all of the coordinate values are moved by the calculated distance, a new path defined by the connector coordinate set may be the straight line 1800.

Figure 19:
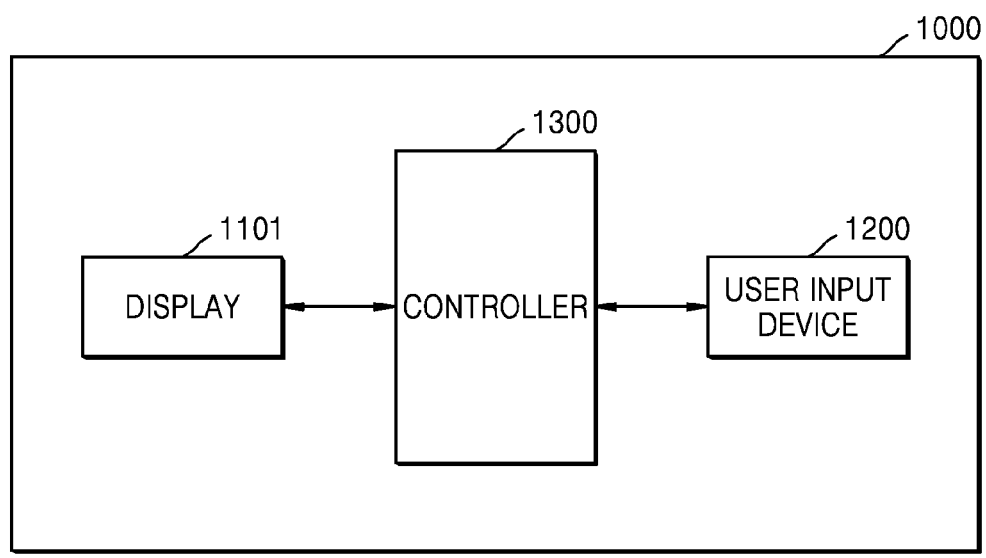
FIGS. 19 to 21 are block diagrams of a device according to one or more exemplary embodiments.
Figure 20:
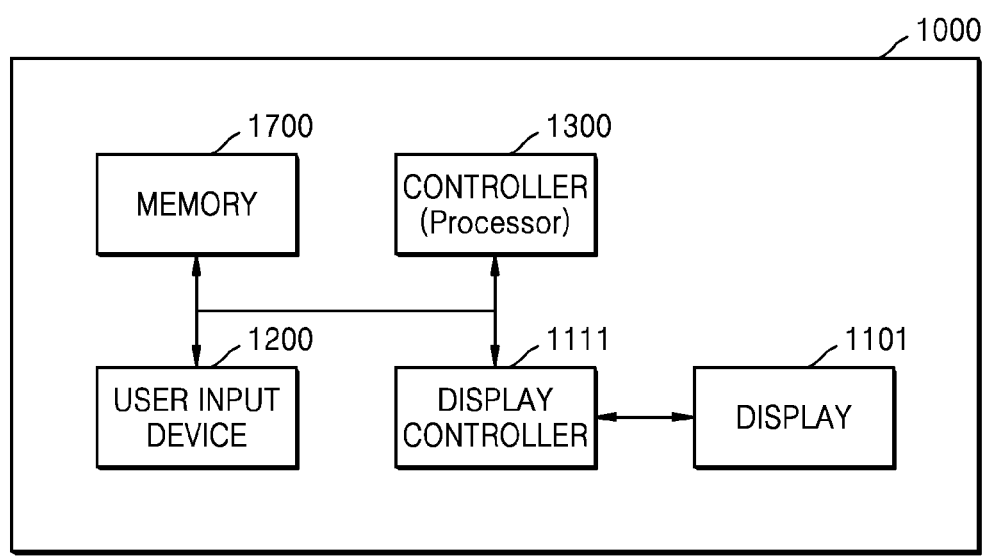
Figure 21:
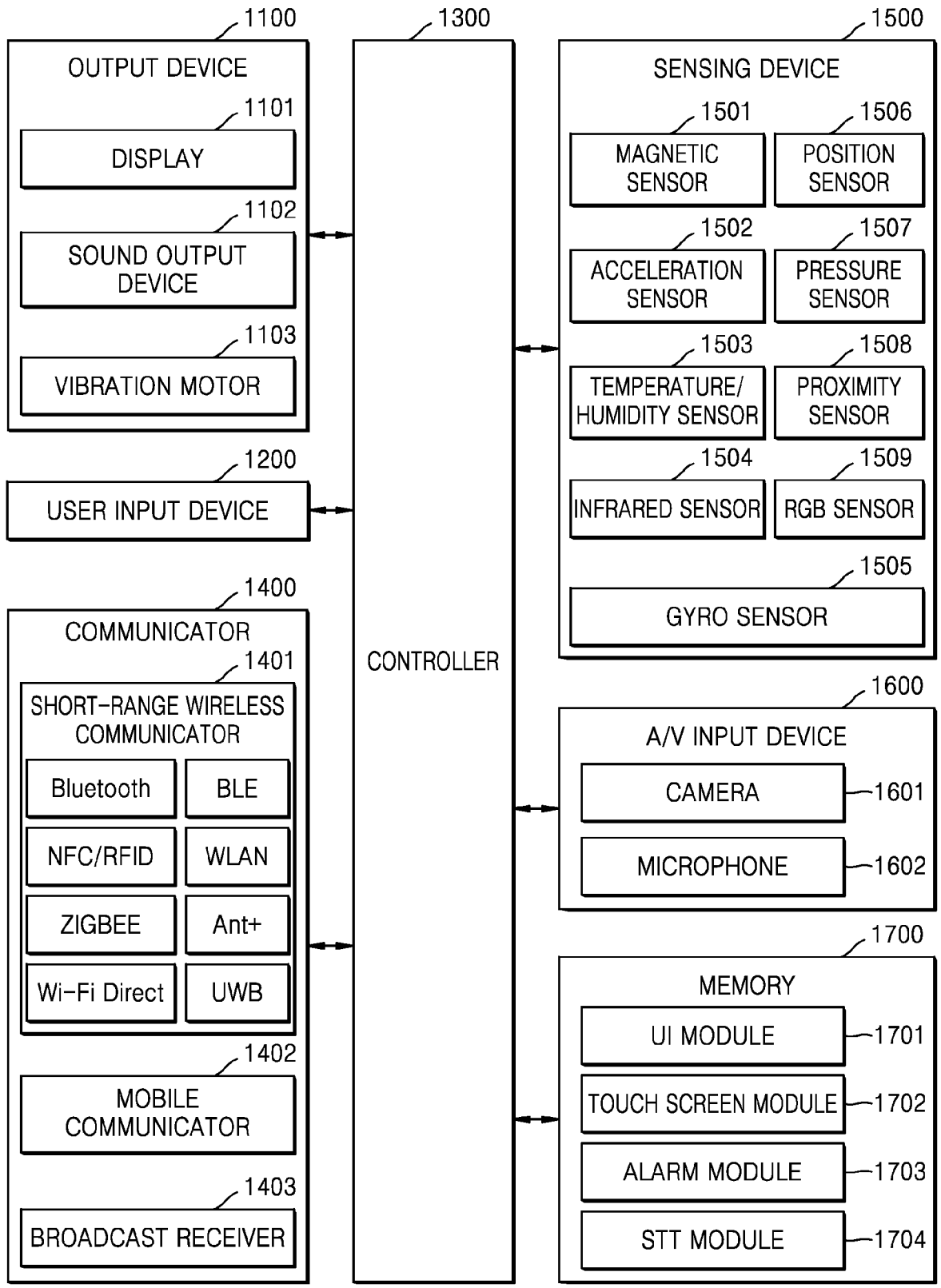

FIGS. 19 to 21 as block diagrams of a device 1000 according to one or more exemplary embodiments.

Referring to FIG. 19, the device 1000 may include a display 1101, a user input device 1200, and a controller 1300. However, not all illustrated elements are necessary elements. The device 1000 may be embodied with more or less elements than the illustrated elements.

For example, as illustrated in FIG. 20, the device 1000 may further include a memory 1700 and a display controller 1111 in addition to the display 1101, the user input device 1200, and the controller 1300.

In addition, as illustrated in FIG. 21, the device 1000 may further include an output device 1100, a communicator 1400, a sensing device 1500, and an audio/video (A/V) input device 1600.

Hereinafter, the elements will be described.

The output device 1100 may output an audio signal, a video signal, or a vibration signal and may include the display 1101, a sound output device 1102, a vibration motor 1103, and the like.

The display 1101 may display information processed by the device 1000.

The display 1101 may display a container object and a plurality of items capable of being moved to the container object. The container object may be a folder or a different type of user interface object.

The items displayed on the display 1101 may be an object displayed on the display 1101 of the device 1000 to execute an application, an audio file, and a text file and may be, for example, an icon, an image, or a text.

The display 1101 may display items to be moved to the container object of the plurality of items to be distinguished from other items under control of the controller 1300 described below. The display 1101 may display a state in which the items are moved into the container object along a connector, under control of the controller 1300 described below.

A predetermined software screen displayed on the display 1101 may include a plurality of pages. For example, the display 1101 may display a first page and a second page, the first page displaying the container object and a plurality of items and the second page displaying a plurality of items different from the plurality of items displayed on the first page.

In addition, the display 1101 may display a menu for managing the container object under control of the controller 1300 described later.

A touch screen may be implemented by forming the display 1101 and a touch pad to have a mutual layer structure, allowing the display 1101 to be used as both an output device and input device. The display 1101 may include at least one of a liquid crystal display, a thin film transistor-liquid crystal display, an organic light-emitting diode, a flexible display, a three-dimensional display (3D display), and an electrophoretic display. According to a type of the device 1000, the device 1000 may include two or more displays 1101.

The sound output device 1102 may output audio data that is received from the communication device 1400 or is stored in a memory 1700. The sound output device 112 may also output a sound signal (e.g., a call signal receiving sound, a message receiving sound, a notifying sound, or the like) related to capabilities performed by the device 1000. The sound output device 1102 may include a speaker, a buzzer, or the like The vibration motor 1103 may output a vibration signal For example, the vibration motor 1103 may output the vibration signal in concert with an output of the audio data (e.g., the call signal receiving sound, the message receiving sound, or the like) or video data. In addition, the vibration motor 1103 may output a vibration signal when a touch is input to the touch screen.

The user input device 1200 may mean a unit by which a user inputs data to control the device 1000. For example, the user input device 1200 may include one or more of a key pad, a dome switch, a touch capacitive type touch pad, a pressure resistive type touch pad, an infrared beam sensing type touch pad, a surface acoustic wave type touch pad, an integral strain gauge type touch pad, a piezo effect type touch pad, any other type of touch pad, a jog wheel, and a jog switch. However, the exemplary embodiment is not limited thereto.

The user input device 1200 may receive a user input of touching and dragging the container object. In addition, the user input device 1200 may receive a user input of touching the container object and forming a loop. The user input device 1200 may include the touch screen.

The controller 1300 may control all operations of the device 1000. For example, the controller 1300 may control the output device 1100, the user input device 1200, the communicator 1400, the sensing device 1500, the A/V input device 1600, and the like by executing programs stored in the memory 1700. Accordingly, the device 1000 may move the items into the container object by using the connector.

The controller 1300 may display the connector connected from the container object to a current position of the user input on the display 1101 in response to the user input. In addition, the controller 1300 may change a shape of the connector during the receiving of the user input. At this time, the controller 1300 may change the shape of the connector such that a distance between two ends of the connector is minimized.

The controller 1300 may move an item of the plurality of items on the display 1101, which is located within a predetermined distance from the end of the connector, into the container object.

In addition, the controller 1300 may move an item of the plurality of items on the display 1101, which is enclosed by the loop into the container object in response to the user input, into the container object.

The controller 1300 may move only an item completely enclosed by the loop into the container object. According to one or more exemplary embodiments, the controller 1300 may move an item partially enclosed by the loop into the container object.

In addition, the controller 1300 may move an item of the plurality of items, which is located within the predetermined distance from the end of the connector for a predetermined time or more, into the container object.

The communicator 1400 may include one or more elements allowing communication between the device 1000 and external devices or between the device 1000 and a server. For example, the communicator 1400 may include a short-range wireless communicator 1401, a mobile communicator 1402, and a broadcast receiver 1403.

The short-range wireless communicator 1401 may include, but is not limited to, a Bluetooth communicator, a near field communicator, a wireless local area network (WLAN or Wi-Fi) communicator, a ZigBee communicator, an infrared data association (IrDA) communicator, a Wi-Fi direct (WFD) communicator, an ultra wideband (UWB) communicator, or an Ant+ communicator.

The mobile communicator 1402 may exchange a wireless signal with at least one of a base station, an external terminal, and a server on a mobile communication network. The wireless signal may include various types of data according to communication of a sound call signal, a moving picture call signal, or a text/multimedia message.

The broadcast receiver 1403 may receive a broadcast signal and/or information related to a broadcast from the outside through a broadcast channel. The broadcast channel may include a satellite channel and a ground wave channel. According to one or more exemplary embodiments, the device 1000 may not include the broadcast receiver 1403.

The sensing device 1500 may sense a state of the device 1000 or a state around the device 1000 and may transmit the sensed information to the controller 1300.

The sensing device 1500 may include, but is not limited to, at least one of a magnetic sensor 1501, an acceleration sensor 1502, a temperature/humidity sensor 503, an infrared sensor 1504, a gyro sensor 1505, a position sensor (for example, a GPS sensor) 1506, a pressure sensor 1507, a proximity sensor 1508, and an RGB sensor (illuminance sensor) 1509.

The A/V input device 1600 may input an audio signal or a video signal and may include a camera 1601 and a microphone 1602. The camera 1601 may obtain an image frame such as a still image or a moving picture via an image sensor during a moving picture call mode or an image-capturing mode. An image captured via the image sensor may be processed by the controller 1300 or a separate image processor.

The image frame processed by the camera 1601 may be stored in the memory 1700 or may be transmitted to the outside via the communicator 1400. According to a type of the device 1000, the device 1000 may include two or more cameras 1601.

The microphone 1602 may receive a sound signal from the outside as an input and may process the received sound signal to an electrical voice data signal. For example, the microphone 1602 may receive a sound signal from an external device or a speaker. To remove noise that occurs while the sound signal is received from the outside, the microphone 1602 may use various noise removing algorithms.

The memory 1700 may store a program for processing and controlling the controller 1300 or may store a plurality of pieces of input/output data (e.g., an application, content, an image file, a text file, etc.).

The memory 1700 may include a storage medium of at least one type of a flash memory, a hard disk, a multimedia card type memory, a card type memory such as a Secure Digital (SD) or eXtreme Digital (XD) card memory, RAM, static random-access memory (SRAM), ROM, Electrically Erasable Programmable Read-Only Memory (EEPROM), programmable read-only memory (PROM), a magnetic memory, a magnetic disc, and an optical disc. In addition, the device 1000 may run web storage or a cloud server that performs a storage function of the memory 1700 on the Internet.

The programs stored in the memory 1700 may be classified into a plurality of modules according to their functions. For example, the programs stored in the memory 260 may be classified into a UI module 1701, a touch screen module 1702, an alarm module 1703, a speak to test (STT) module, etc.

The UI module 1701 may provide a UI or GUI in connection with the device 1000 for each application. The touch screen module 1702 may detect a user's touch gesture on the touch screen and may transmit information on the touch gesture to the controller 1300. The touch screen module 1702 may include separate hardware including a controller.

Various sensors may be arranged in or near the touch screen to detect a touch or a proximate touch on the touch sensor. An exemplary sensor to detect the touch may include a tactile sensor. The tactile sensor may detect a contact of an object at or beyond a sensitivity of a human being. The tactile sensor may detect various types of information such as roughness of a contact surface, hardness of a contact object, a temperature of a contact point, or the like.

Examples of the sensor that detects the touch on the touch screen may include a proximity sensor.

The proximity sensor may detect the presence or absence of an object approaching a predetermined detection surface or an object existing nearby the proximity sensor, by using a force of an electro-magnetic field or an infrared ray without a mechanical contact. Examples of the proximity sensor may include a transmission-type photoelectric sensor, a direction reflection-type photoelectric sensor, a mirror reflection-type photoelectric sensor, a high frequency oscillation-type proximity sensor, a capacitance-type proximity sensor, a magnetic proximity sensor, an infrared-type proximity sensor, or the like. The touch gesture of the user may include a tap gesture, a touch and hold gesture, a double tap gesture, a drag gesture, a panning gesture, a flick gesture, a drag & drop gesture, a swipe gesture, or the like.

The alarm module 1703 may generate a signal for notifying the user about an occurrence of an event in the device 1000. Examples of the event occurring in the device 1000 may include a call signal receiving event, a message receiving event, a key signal input event, a schedule notifying event, or the like. The alarm module 1703 may output an alarm signal in a video signal form through the display 1101, may output the alarm signal in an audio signal form through the sound output device 1102, and may output the alarm signal in a vibration signal form through the vibration motor 1103.

The STT module 1704 may change a voice included in a multimedia content into a text and may generate a transcript corresponding to the multimedia content. At this time, the transcript may be mapped to replay time information of the multimedia content.

The display controller 1111 may be control the display 1101 through a wired or wireless connection. Computer programming commands may control the display controller 1111 to display the container object and the plurality of items on the display 1101.

The exemplary embodiments set forth herein may be embodied as program instructions that can be executed by various computing units and recorded on a non-transitory computer-readable recording medium. Examples of the non-transitory computer-readable recording medium may include program instructions, data files, and data structures solely or in combination. The program instructions recorded on the non-transitory computer-readable recording medium may be designed and configured for exemplary embodiments, or may be well known to and usable by one of ordinary skill in the field of computer software. Examples of the non-transitory computer-readable recording medium may include magnetic media (e.g., a hard disk, a floppy disk, a magnetic tape, etc.), optical media (e.g., a compact disc-read-only memory (CD-ROM), a digital versatile disk (DVD), etc.), magneto-optical media (e.g., a floptical disk, etc.), and a hardware device configured to store and execute program instructions (e.g., a read only memory (ROM), a random access memory (RAM), a flash memory, etc.). Examples of the program instructions may include not only machine language codes prepared by a compiler but also high-level codes executable by a computer by using an interpreter.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments. For example, each element described as a singular form may be implemented in a distributed manner, and elements described as distributed may be implemented in an integrated manner.

While one or more exemplary embodiments have been described with reference to the figures, it will be understood by those of ordinary skill in the art that various changes in form and details may be made therein without departing from the spirit and scope as defined by the following claims.

What is claimed is:

1. An apparatus comprising:
    a display;
    a user input unit configured to obtain a user input; and
    at least one processor configured to:
        control the display to display a container object and a plurality of items that movable into the container object;
        based on the user input indicating a first gesture that originates at the container object while the container object is displayed and moves from the container object to a current position of the user input, control the display to display a first connector being connected from the container object to the current position of the user input, identify a first item of the plurality of items, the first item being located within a predetermined distance from an end of the first connector, and move the first item into the container object; and
        based on the user input indicating a second gesture that originates at the container object and forms a loop, control the display to display a second connector being connected from the container object to the current position of the user input, identify a second item of the plurality of items, enclosed by the loop, and move the second item into the container object,
    wherein the container object remains in a same location on the display during the user input indicating the first gesture and during the user input indicating the second gesture.

2. The apparatus of claim 1, wherein the at least one processor is further configured to identify the second item based on at least one among all portions of the second item being enclosed by the loop, and a predetermined portion or more of the second item being enclosed by the loop.

3. The apparatus of claim 1, wherein the at least one processor is further configured to control the display the first item moving into the container object along the first connector based on a predetermined animation effect.

4. The apparatus of claim 1, wherein the at least one processor is further configured to identify a third item of the plurality of items within the predetermined distance from the current position for a predetermined time, and move the third item into the container object.

5. The apparatus of claim 1, wherein the at least one processor is further configured to control the display to distinguishably display the first item before the first item is moved into the container object.

6. The apparatus of claim 1, wherein the at least one processor is further configured to control the display to display the first item moving into the container object along the first connector.

7. The apparatus of claim 1, wherein the container object and the plurality of items are displayed on a first page of a plurality of pages, and the at least one processor is further configured to, based on the user input corresponding to an edge of the first page, control the display to display a second page of the plurality of pages.

8. The apparatus of claim 1, wherein the at least one processor is further configured to change a shape of the first connector during the obtaining of the user input.

9. The apparatus of claim 1, wherein the at least one processor is further configured to shorten the first connector according to a predetermined criteria during the obtaining of the user input.

10. The apparatus of claim 1, wherein, the at least one processor is further configured to control the display to display a menu for managing the container object based on a user input of touching the container object being obtained for a predetermined time.

11. The apparatus of claim 10, wherein the at least one processor is further configured to reduce a displayed size of the container object and the plurality of items during the displaying of the menu.

12. A method of managing an item, the method comprising:
    displaying a container object and a plurality of items that are movable into the container object;
    obtaining a user input;
    displaying, based on the user input indicating a first gesture that originates at the container object while the container object is displayed and moves from the container object to a current position of the user input, a first connector being connected from the container object to the current position of the user input, identifying a first item of the plurality of items, the first item being located within a predetermined distance from an end of the first connector and moving the first item into the container object; and
    displaying, based on the user input indicating a second gesture that originates at the container object and forms a loop, a second connector being connected from the container object to the current position of the user input, identifying a second item of the plurality of items, enclosed by the loop, and moving the second item into the container object,
    wherein the container object remains in a same location on the display during the user input indicating the first gesture and during the user input indicating the second gesture.

13. The method of claim 12, wherein the identifying the second item comprises identifying at least one among all portions of the second item are completely enclosed by the loop and at least a predetermined portion of the second item is enclosed by the loop.

14. The method of claim 12, further comprising identifying a third item of the plurality of items within the predetermined distance from the current position for a predetermined time; and moving the third item into the container object.

15. The method of claim 12, further comprising distinguishably displaying the first item.

16. The method of claim 12, further comprising displaying the first item moving into the container object along the first connector.

17. An apparatus comprising:
a touchscreen display; and
at least one processor configured to:
control the touchscreen display to display a container object and a plurality of items that are movable into the container object;
based on a user input indicating a gesture originating from the container object and moving from the container object to an end position of the user input, identify a facing direction of the user input at the end position of the user input;
identify a first item of the plurality of items within a predetermined distance of the end position of the user input;
identify a second item of the plurality of items that is adjacent to the first item based on the facing direction;
control the touchscreen display to display an indicator corresponding to the first item and the second item; and
based on the user input stopping, move the first item and the second item into the container object,
wherein the container object remains in a same location on the display during the user input indicating the gesture.

18. The apparatus of claim 3, wherein the predetermined animation effect comprises moving an oval shape along the first connector from the first item to the container object.

19. The method of claim 16, wherein the displaying the first item moving into the container object along the first connector comprises moving an oval shape along the first connector from the first item to the container object.

20. The apparatus of claim 1, wherein the at least one processor is further configured to:
control the display to display the container object at a first location before the first item is moved into the container object, and
control the display to display the container object at the first location after the first item is moved into the container object.

* * * * *